US011997579B2

(12) United States Patent
Buckley et al.

(10) Patent No.: US 11,997,579 B2
(45) Date of Patent: *May 28, 2024

(54) PROVIDING A PUBLIC WARNING SYSTEM MESSAGE

(71) Applicant: Malikie Innovations Limited, Dublin (IE)

(72) Inventors: Adrian Buckley, Tracy, CA (US); Rene Faurie, Versailles (FR)

(73) Assignee: Malikie Innovations Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/681,245

(22) Filed: Feb. 25, 2022

(65) Prior Publication Data
US 2022/0182807 A1    Jun. 9, 2022

Related U.S. Application Data

(63) Continuation of application No. 15/962,871, filed on Apr. 25, 2018, now Pat. No. 11,272,345, which is a
(Continued)

(51) Int. Cl.
*H04W 4/90* (2018.01)
*H04L 67/565* (2022.01)
(Continued)

(52) U.S. Cl.
CPC ............ *H04W 4/90* (2018.02); *H04L 67/565* (2022.05); *H04L 69/18* (2013.01); *H04W 4/40* (2018.02);
(Continued)

(58) Field of Classification Search
CPC ..... H04W 68/12; H04W 88/04; H04W 48/18; H04W 12/10; H04W 76/14; H04L 69/18; H04L 67/565
See application file for complete search history.

(56) References Cited

U.S. PATENT DOCUMENTS

| 10,440,524 B2 | 10/2019 | Ryu et al. |
| 11,272,345 B2 | 3/2022 | Buckley et al. |

(Continued)

FOREIGN PATENT DOCUMENTS

| CN | 1387362 A | 12/2002 |
| CN | 1555636 A | 12/2004 |

(Continued)

OTHER PUBLICATIONS

Ansari, Shuja, et al.; "Vehicular Safety Application Identifier Algorithm for LTE VANET Server"; 8th International Congress on Ultra Modern Telecommunications and Control System and Workshops (ICUMT); 2016; 6 pages.
(Continued)

*Primary Examiner* — Wayne H Cai
(74) *Attorney, Agent, or Firm* — Conley Rose, P.C.; J. Robert Brown, Jr.

(57) ABSTRACT

A method is provided for relaying Public Warning System (PWS) messages. The method includes a communications device receiving a PWS message over a first communication technology. The method also includes the communications device relaying all or part of the PWS message over a second communication technology, wherein the second communication technology is different than the first communication technology.

21 Claims, 15 Drawing Sheets

Related U.S. Application Data continuation of application No. PCT/IB2017/000842, filed on May 4, 2017.

(51) Int. Cl.
| | |
|---|---|
| *H04L 69/18* | (2022.01) |
| *H04W 4/40* | (2018.01) |
| *H04W 4/70* | (2018.01) |
| *H04W 4/80* | (2018.01) |
| *H04W 12/10* | (2021.01) |
| *H04W 48/18* | (2009.01) |
| *H04W 68/12* | (2009.01) |
| *H04W 76/14* | (2018.01) |
| *H04W 88/04* | (2009.01) |

(52) U.S. Cl.
CPC ............... *H04W 4/70* (2018.02); *H04W 4/80* (2018.02); *H04W 12/10* (2013.01); *H04W 48/18* (2013.01); *H04W 68/12* (2013.01); *H04W 76/14* (2018.02); *H04W 88/04* (2013.01)

(56) References Cited

U.S. PATENT DOCUMENTS

| | | |
|---|---|---|
| 2011/0237218 A1 | 9/2011 | Aoyama et al. |
| 2015/0215757 A1 | 7/2015 | Miskiewicz et al. |
| 2015/0372774 A1 | 12/2015 | Samuelsson et al. |
| 2017/0171724 A1 | 6/2017 | Kazmi et al. |
| 2017/0215047 A1 | 7/2017 | Lee et al. |
| 2017/0230803 A1 | 8/2017 | Calabuig Gaspar et al. |
| 2018/0132304 A1 | 5/2018 | Lee et al. |
| 2019/0313375 A1 | 10/2019 | Loehr et al. |
| 2020/0146100 A1 | 5/2020 | Lee et al. |

FOREIGN PATENT DOCUMENTS

| | | |
|---|---|---|
| CN | 105105762 A | 12/2015 |
| CN | 106454752 A | 2/2017 |
| CN | 106471826 A | 3/2017 |
| DE | 102013103270 A1 | 10/2013 |
| JP | 2004312578 A | 11/2004 |
| JP | 2008244813 A | 10/2008 |
| JP | 2014168197 A | 9/2014 |
| JP | 2018526937 A | 9/2018 |
| WO | 2015050396 A1 | 4/2015 |
| WO | 2015163626 A1 | 10/2015 |
| WO | 2016003174 A1 | 1/2016 |
| WO | 2017038494 A1 | 3/2017 |
| WO | 2017043940 A1 | 3/2017 |

OTHER PUBLICATIONS

3GPP TR 22.969 V1.0.0; 3rd Generation Partnership Project; Technical Specification Group Services and System Aspects; Feasibility Study on Enhancements of Public Warning System; Stage 1; Release 15; Jun. 2017; 20 pages.
3GPP TS 22.261 V16.3.0; 3rd Generation Partnership Project; Technical Specification Group Services and System Aspects; Service Requirements for the 5G System; Stage 1; Release 16; Mar. 2018; 54 pages.
3GPP TS 22.268 V16.0.0; 3rd Generation Partnership Project; Technical Specification Group Services and System Aspects; Public Warning System (PWS) Requirements; Release 16; Mar. 2018; 20 pages.
3GPP TS 22.278 V15.2.0; 3rd Generation Partnership Project; Technical Specification Group Services and System Aspects; Service Requirements for the Evolved Packet System (EPS); Release 15; Mar. 2018; 49 pages.
3GPP TS 23.041 V15.1.0; 3rd Generation Partnership Project; Technical Specification Group Core Network and Terminals; Technical Realization of Cell Broadcast Service (CBS); Release 15; Mar. 2018; 92 pages.
3GPP TS 23.285 V15.0.0; 3rd Generation Partnership Project; Technical Specification Group Services and System Aspects; Architecture Enhancements for V2X Services; Release 15; Mar. 2018; 36 pages.
3GPP TS 23.303 V15.0.0; 3rd Generation Partnership Project; Technical Specification Group Services and System Aspects; Proximity-Based Services; Stage 2; Release 15; Jun. 2017; 130 pages.
3GPP TS 36.321 V15.1.0; 3rd Generation Partnership Project; Technical Specification Group Radio Access Network; Evolved Universal Terrestrial Radio Access (E-UTRA); Medium Access Control (MAC) Protocol Specification; Release 15; Mar. 2018; 109 pages.
3GPP TS 36.331 V15.1.0; 3rd Generation Partnership Project; Technical Specification Group Radio Access Network; Evolved Universal Terrestrial Radio Access (E-UTRA); Radio Resource Control; Protocol Specification; Release 15; Mar. 2018; 786 pages.
ETSI EN 302 637-2 V1.3.2; Intelligent Transport Systems (ITS); Vehicular Communications; Basic Set of Applications; Part 2: Specification of Cooperative Awareness Basic Service; Nov. 2014; 44 pages.
ETSI EN 302 637-3 V1.2.2; Intelligent Transport Systems (ITS); Vehicular Communications; Basic Set of Applications; Part 3: Specifications of Decentralized Environmental Notification Basic Service; Nov. 2014; 73 pages.
ETSI EN 302 665 V1.1.1; Intelligent Transport Systems (ITS); Communications Architecture; Sep. 2010; 44 pages.
ETSI TS 102 637-3 V1.1.1; Intelligent Transport Systems (ITS); Vehicular Communications; Basic Set of Applications; Part 3: Specifications of Decentralized Environmental Notification Basic Service; Sep. 2010; 46 pages.
ETSI TS 102 894-2 V1.2.1; Intelligent Transport Systems (ITS); Users and Applications Requirements; Part 2: Applications and Facilities Layer Common Data Dictionary; Sep. 2014; 94 pages.
ETSI TS 102 965 V1.3.1; Intelligent Transport Systems (ITS); Application Object Identifier (ITS-AID); Registration; Nov. 2016; 8 pages.
3GPP TSG-SA Meeting #73; "New WID on Study on Enhancements of Public Warning System (FS-ePWS)"; SP-160733; New Orleans, USA; Sep. 21-23, 2016; 5 pages.
3GPP 23.041 V14.0.0; 3rd Generation Partnership Project; Technical Specification Group Core Network and Terminals; Technical Realization of Cell Broadcast Service (CBS); Release 14; Sep. 2016; 71 pages.
Office Action dated Aug. 23, 2018; U.S. Appl. No. 15/962,871, filed Apr. 25, 2018; 16 pages.
Final Office Action dated Jan. 18, 2019; U.S. Appl. No. 15/962,871, filed Apr. 25, 2018; 15 pages.
Advisory Action dated Mar. 13, 2019; U.S. Appl. No. 15/962,871, filed Apr. 25, 2018; 5 pages.
Office Action dated Jun. 17, 2019; U.S. Appl. No. 15/962,871, filed Apr. 25, 2018; 13 pages.
Final Office Action dated Jan. 3, 2020; U.S. Appl. No. 15/962,871, filed Apr. 25, 2018; 13 pages.
Advisory Action dated Mar. 6, 2020; U.S. Appl. No. 15/962,871, filed Apr. 25, 2018; 2 pages.
Office Action dated Jun. 4, 2020; U.S. Appl. No. 15/962,871, filed Apr. 25, 2018; 13 pages.
Final Office Action dated Oct. 21, 2020; U.S. Appl. No. 15/962,871, filed Apr. 25, 2018; 13 pages.
Advisory Action dated Jan. 8, 2021; U.S. Appl. No. 15/962,871, filed Apr. 25, 2018; 2 pages.
Office Action dated Mar. 19, 2021; U.S. Appl. No. 15/962,871, filed Apr. 25, 2018; 18 pages.
Final Office Action dated Jul. 16, 2021; U.S. Appl. No. 15/962,871, filed Apr. 25, 2018; 22 pages.
Advisory Action dated Sep. 17, 2021; U.S. Appl. No. 15/962,871, filed Apr. 25, 2018; 3 pages.
Notice of Allowance dated Nov. 5, 2021; U.S. Appl. No. 15/962,871, filed Apr. 25, 2018; 16 pages.
PCT International Search Report; Application No. PCT/IB2017/000842; dated Jan. 16, 2018; 6 pages.
PCT Written Opinion of the International Searching Authority; Application No. PCT/IB2017/000842; dated Jan. 16, 2018; 8 pages.

(56) References Cited

OTHER PUBLICATIONS

Chinese Office Action; Application No. 201780090296.2; dated Oct. 28, 2020; 14 pages.
Chinese Office Action; Application No. 201780090296.2; dated Jun. 18, 2021; 16 pages.
Chinese Office Action; Application No. 201780090296.2; dated Nov. 2, 2021; 18 pages.
European Office Action; Application No. 17743384.4; dated Jun. 28, 2021; 3 pages.
Japanese Office Action; Application No. 2019-559729; dated Apr. 8, 2021; 9 pages.
Japanese Office Action; Application No. 2019-559729; dated Sep. 27, 2021; 11 pages.
Korean Office Action; Application No. 10-2019-7035354; dated Mar. 24, 2021; 12 pages.
Chinese Office Action; Application No. 201780090296.2; dated Oct. 13, 2022; 23 pages.
Chinese Office Action; Application No. 201780090296.2; dated Mar. 31, 2022; 16 pages.
Chinese Board Decision; Application No. 201780090296.2; dated Nov. 30, 2022; 39 pages.
Canadian Office Action; Application No. 305984; dated Jun. 6, 2023; 5 pages.
European Extended Search Report; Application No. 23184297.2; dated Dec. 14, 2023; 11 pages.

500

4.2.xx EF$_{RelayPWS}$ (Public Warning System)

If service n°xx is "available", this file shall be present. This EF contains the configuration parameters for UE to Network Relay of PWS.

| Identifier: '6Fxx' | Structure: transparent | Optional |
|---|---|---|
| File size: 1+Z bytes | Update activity: low | |
| Access Conditions: READ ALW UPDATE ADM ACTIVATE ADM DEACTIVATE ADM | | |

| Bytes | Description | M/O | Length |
|---|---|---|---|
| 1 to Z+1 | PWS configuration | M | 1+Z bytes |

510

Contents:
  Configuration for UE to Network Relay PWS

Coding:

520

First byte:

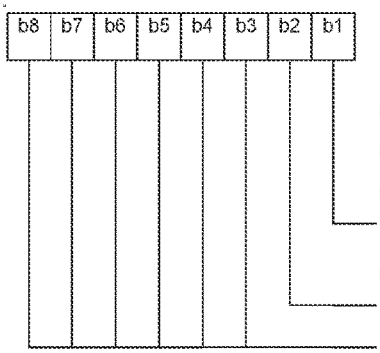

b1=0 relay all PWS warning messages in HPLMN and equivalent PLMNs b1=1 ignore all PWS warning messages in HPLMN and equivalent PLMNs b2=0 relay all PWS warning messages in VPLMNs b2=1 ignore all PWS warning messages in VPLMNs RFU (see TS 31.101 [11])

Successive bytes:
  RFU (see TS 31.101 [11])

FIG. 5

ETWS information
Indication of an ETWS primary notification. The ETWS warning type is used to notify upper layers.

| Information Element/Group name | Need | Type and reference | Semantics description |
|---|---|---|---|
| Warning Type – 605 | M | Octet string (1..2) | IE "Warning Type" as defined in [w3] |
| Message Identifier – 610 | M | Octet string (2) | IE "Message Identifier" as defined in [w3] |
| Serial Number – 615 | M | Octet string (2) | IE "Serial Number" as defined in [w3] |

FIG. 6

| Parameter |
|---|
| Serial Number – 705 |
| Message Identifier – 710 |
| Data Coding Scheme – 715 |
| Page Parameter – 720 |
| Content of Message – 725 |

FIG. 7

| Parameter |
|---|
| Message Type - 805 |
| Message Identifier – 810 |
| Serial Number – 815 |
| Data Coding Scheme – 820 |
| CB Data – 825 |

FIG. 8

| Parameter |
|---|
| Message Identifier – 905 |
| Serial Number – 910 |
| CB Data {Warning Message Content E-UTRAN} – 915 |
| Data Coding Scheme – 920 |

FIG. 9

The information provided here is based on best knowledge without taking any liability for errors in the presentation, or general issues related to usage of allocated numbers including deprecated and re-allocated numbers. Details on the purpose of allocated numbers are to be presented in specifications of the owner of allocated numbers. Some considerations related to the usage of ITS-AID are presented in ISO 17419.IEEE allocations are listed also in IEEE 1609.12 *Standard for Wireless Access in Vehicular Environments (WAVE) - Identifier* Allocations. In order to request allocations in the USA, please contact IEEE 1609 WG. For other allocations please contact ISO TC204 WG18 (itsaidRegistry@its-standards.info).

| Date Numerical value decimal / hex | hex | Size | Name | Type | Comments unaligned PER of ASN.1 Document | Owner | ID | Specification | Owner |
|---|---|---|---|---|---|---|---|---|---|
| 15.05.2011 | 0 = 0x00 | 0p00 | 1 | assigned | ISO | system | ITS application class | ISO 15628 | CEN/ISO |
| 15.05.2011 | 1 = 0x01 | 0p01 | 1 | assigned | ISO | electronic-fee-collection | ITS application class | ISO 15628 | CEN/ISO |
| 15.05.2011 | 2 = 0x02 | 0p02 | 1 | assigned | ISO | freight-fleet-management | ITS application class | ISO 15628 | CEN/ISO |
| 15.05.2011 | 3 = 0x03 | 0p03 | 1 | assigned | ISO | public-transport | ITS application class | ISO 15628 | CEN/ISO |
| 15.05.2011 | 4 = 0x04 | 0p04 | 1 | assigned | ISO | traffic-traveller-information | ITS application class | ISO 15628 | CEN/ISO |
| 15.05.2011 | 5 = 0x05 | 0p05 | 1 | assigned | ISO | traffic-control | ITS application class | ISO 15628 | CEN/ISO |
| 15.05.2011 | 6 = 0x06 | 0p06 | 1 | assigned | ISO | parking-management | ITS application class | ISO 15628 | CEN/ISO |
| 15.05.2011 | 7 = 0x07 | 0p07 | 1 | assigned | ISO | geographic-road-database | ITS application class | ISO 15628 | CEN/ISO |
| 15.05.2011 | 8 = 0x08 | 0p08 | 1 | assigned | ISO | medium-range-preinformation | ITS application class | ISO 15628 | CEN/ISO |
| ....... | | | | | | | | | |
| *15.05.2011* | *143 = 0x8f* | *0p80.0f* | *1* | *assigned* | *ISO* | *3GPP PWS* | *ITS application class* | *3GPP TS .x.y.z* | *CEN/ISO* |

FIG. 10

4.2.xx EF$_{RelayPWSLayer2id}$ (Public Warning System Layer 2 ID)

If service n°xx is "available", this file shall be present. This EF contains the configuration parameters for UE to Network Relay of PWS for Layer 2ID.

| Identifier: '6Fxx' | Structure: transparent | Optional |
|---|---|---|
| File size: n bytes | Update activity: low | |

Access Conditions:
    READ          ALW
    UPDATE      ADM
    ACTIVATE    ADM
    DEACTIVATE  ADM

| Bytes | Description | M/O | Length |
|---|---|---|---|
| 1 | Number of PWS Layer 2 IDs | M | 1 |
| 2 | PWS | M | 1 |
| 3-N | Layer-2 ID | M | N |

Contents:
    Configuration for UE to Network Relay PWS Layer 2ID

Coding:

Coding PWS

| Value | Meaning |
|---|---|
| "00000000" | All PWS messages |
| "00000001" | ETWS message |
| "00000010" | CMAS message |

Coding of the PWS byte

ALTERNATIVE

Only the Layer-2ID is present in the file.

FIG. 11

| DF_ItsPduHeader | |
|---|---|
| Descriptive Name | ItsPduHeader |
| Identifier | DataType_1 |
| ASN.1 representation | ItsPduHeader ::= SEQUENCE {<br>    protocolVersion INTEGER (0..255),<br>    messageID INTEGER{ denm(1), cam(2), poi(3), spatem(4), mapem(5), ivim(6), ev-rsr(7), tistpgtransaction(8), srem(9), ssem(10), evcsn(11), pws(12) } (0..255),<br>    stationID StationID<br>} |
| Definition | Common message header for application and facilities layer messages. It is included at the beginning of an ITS message as the message header.<br><br>The DF shall include the following information:<br>• protocolVersion: version of the ITS message and/or communication protocol,<br>• messageID: Type of the ITS message. Following message type values are assigned in the present document:<br>    – denm(1): Decentralized Environmental Notification Message (DENM) as specified in ETSI EN 302 637-3 [i.3],<br>    – cam(2): Cooperative Awareness Message (CAM) as specified in ETSI EN 302 637-2 [i.2],<br>    – poi(3): Point of Interest message as specified in ETSI TS 101 556-1 [i.11],<br>    – spatem(4): Signal Phase And Timing (SPAT) message as specified in SAE J2735 [i.12] and in ETSI TS 103 301,<br>    – mapem(5): MAP message as specified in SAE J2735 [i.12] and in ETSI TS 103 301,<br>    – ivim(6): In Vehicle Information (IVI) message as defined in ISO TS 19321 [i.13],<br>    – ev-rsr(7): Electric vehicle recharging spot reservation message, as defined in ETSI TS 101 556-3 [i.14],<br>    – tistpgtransaction(8): messages for Tyre Information System (TIS) and Tyre Pressure Gauge (TPG) interoperability, as specified in ETSI TS 101 556- 2,<br>    – srem(9): Traffic light Signal Request Message as specified in ETSI TS 103 301,<br>    – ssem(10): Traffic Light Signal Request Status Message as specified in ETSI TS 103 301.<br>    – evcsn(11): Electrical Vehicle Charging Spot Notification message as specified in ETSI TS 101 556 – 1<br>    – PWS(12): Public Warning System Messages as specified in TBD<br>• stationID: the identifier of the ITS-S that generates the ITS message in question. It shall be represented as specified in clause A.77 *StationID*. |
| Unit | N/A |
| Category | Communication information |

NOTE: The TBD would refer to a document that specifies the format of the messages. These formats could be any of those listed in this paper or PWSHeader defined below.

FIG. 12

PWSHeader

| | |
|---|---|
| Descriptive Name | PWSHeader |
| Identifier | DataType_XXX |
| ASN.1 representation | ```
PWSHeader ::= SEQUENCE {
    protocolVersion INTEGER (0..255),
    source technology INTEGER{ GERAN(1), UTRAN(2), E-UTRAN(3), NR(4)
} (0..255),
    PWSmessage bytestring (0..N),
}
``` |
| Definition | message header identifies the source technology of the Public Warning System Message.<br><br>The DF shall include the following information:<br>• protocolVersion: version of the ITS message and/or communication protocol,<br>• source technology: Technology the PWS message was received on before being transmitted via DENM. Following message type values are assigned in the present document:<br>    – GERAN: 1<br>    – UTRAN: 2<br>    – E-UTRAN: 3<br>    – NR: 4<br>• PWS message: contains the PWS message as defined in 3GPP TS 23.040 according to the technology indicated in the source technology field. |
| Unit | N/A |
| Category | Communication information |

NOTE: The TBD would refer to a document that specifies the format of the messages. These formats could be any of those listed in this paper PWS bytestring – is a bytestring representation of Data Structures 700, 800, and 900

FIG. 13

```
6.2.4    DENM format

DecentralizedSituation::= SEQUENCE {
    -- traffic status near the event position, defined based on [2], TPEG table tec001
    trafficFlowEffect       TrafficFlowEffect       OPTIONAL,   -- 1 byte.
    -- event direct cause and sub cause description as defined in tab6.1 and in [2]
    situation               Situation,
    -- linked cause if information is available.
    linkedCause             Situation               OPTIONAL,   -- 2 Byte,
    -- severity value of the event, defined in [2], TPEG table tec003
    severity                Severity,               -- 1 byte
    -- characteristics of the event
    eventCharact            SEQUENCE                -- EventCharact 1 byte
    {
                            -- event mobility description, set to TRUE if the event is in mobility
                            eventmobility   BOOLEAN,
                            -- whether the event is caused by the originator ITS station
                            causeType       ENUMERATED { itsStation, geographicalRegion },
                            -- whether the event is physicalling relevant to the receiving ITS station
                            relevance       ENUMERATED {physicallyRelevant, difficultDrivingConditions },
                            -- whether the event is time critical road safety event, set to TRUE if it is the case.
                            timeCriticality BOOLEAN,
                            -- more characteristics may be added.
    } OPTIONAL, vehicleCommonParameters VehicleCommonParameters OPTIONAL,
    profile                 ProfileParameters       OPTIONAL
    PWS                     Container               OPTIONAL

}

Container ::= SEQUENCE {
    3GPPcoding              Codingscheme,
    Warningtype             Warntype, OPTIONAL
    serialnumber            ByteString(SIZE(0..N)) OPTIONAL
    contents                ByteString(SIZE(0..N)), OPTIONAL
    -- rebroadcast, set to TRUE if the contents can be rebroadcast
    rebroadcast             BOOLEAN,
    ...
} OPTIONAL, Codingscheme ::=INTEGER{
    3GPP TS 23.041 [x] subclause 9.4.1.2      (101)
    3GPP TS 23.041 [x] subclause 9.4.1.3      (102)
    3GPP TS 23.041 [x] subclause 9.4.2.2      (103)
    3GPP TS 23.041 [x] subclause 9.4.3.2      (104)
    3GPP TS 23.041 [x] subclause 9.4.3.3      (105)

```
Warntype ::=INTEGER{
    Earthquake                          (101)
    Tsunami                             (102)
    Earthquake and Tsunami              (103)
    Test                                (104)
    Other                               (105)

} (0..255)

........

Situation ::= SEQUENCE {
    cause           CauseCode,      -- 1 byte
    subCause        SubCauseCode    -- 1 byte
}

-- 1 to 100 indicates causecode defined within [2]
-- 101 to 255 indicates causecode without being defined by [2]
CauseCode::=INTEGER{
    reserved                (0),
    dangerousDriving        (101),
    intersectionViolation   (102),
    vehicleProblem          (103),
    intersectionCollision   (104),
    hazardousLocation       (105),
    PWS                     (106)

PROVIDING A PUBLIC WARNING SYSTEM MESSAGE

CROSS-REFERENCE TO RELATED APPLICATIONS

This application is a continuation of U.S. patent application Ser. No. 15/962,871 filed Apr. 25, 2018 by Adrian Buckley, et al. entitled "Providing a Public Warning System Message", which is a continuation of International Application No. PCT/IB2017/000842 filed May 4, 2017 by Adrian Buckley, et al. entitled, "Providing A Public Warning System Message", both of which are incorporated by reference herein as if reproduced in their entirety.

BACKGROUND

As telecommunications technology has evolved, more advanced network access equipment has been introduced that can provide services that were not possible previously. This network access equipment might include systems and devices that are improvements of the equivalent equipment in a traditional wireless telecommunications system. Such advanced network access equipment may be included in evolving wireless communications standards, such as long-term evolution (LTE). For example, in an LTE system the advanced network access equipment might include an Evolved Universal Terrestrial Radio Access Network (E-UTRAN) node B (eNB). In various wireless communications systems, the advanced network access equipment may include a base station, a wireless access point, or a similar component operable as an access node according to a corresponding wireless communications standard. Any such component will be referred to herein as an eNB, but it should be understood that such a component is not necessarily an eNB. Such a component may also be referred to herein as an access node or base station.

As used herein, the term "user equipment" (UE) can refer to mobile devices such as mobile telephones, personal digital assistants, handheld or laptop computers, and similar devices that have telecommunications capabilities. Such a UE might comprise a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might comprise the device itself without such a card. The term "UE" may also refer to devices that have similar capabilities but that are not transportable, such as fixed line telephones, desktop computers, or set-top boxes. The term "UE" can also refer to any hardware or software component that can terminate a Session Internet Protocol (SIP) session.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 is a diagram of an example data structure comprising configuration information according to an embodiment of the disclosure.

FIG. 6 is a diagram of an example PWS data structure according to an embodiment of the disclosure.

FIGS. 7-9 illustrate possible example implementations of the PWS data structure according to embodiments of the disclosure.

FIGS. 10 and 11 illustrate possible example implementations of identifying PWS messages according to an embodiment of the disclosure.

FIG. 12 illustrates a possible example implementation of an Intelligent Transport System (ITS) Protocol Data Unit (PDU) Header according to an embodiment of the disclosure.

FIG. 13 illustrates an example of a PWS Header according to an embodiment of the disclosure.

FIG. 15 illustrates a possible example data structure of a Decentralized Environmental Notification Message (DENM) according to an embodiment of the disclosure.

DETAILED DESCRIPTION

Figure 1:
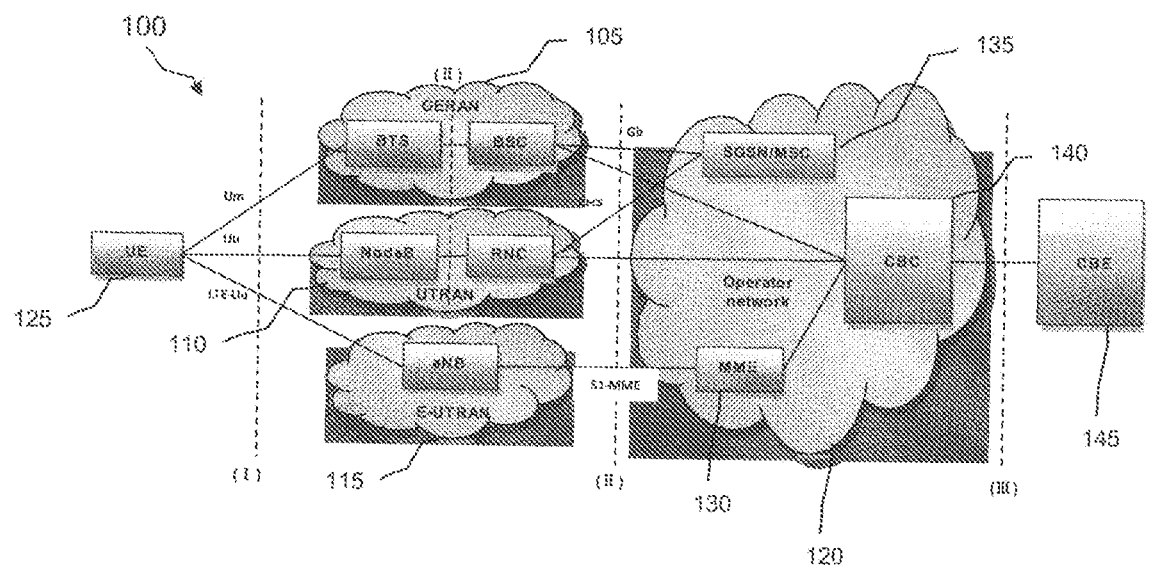
FIG. 1 is an example diagram of a security architecture according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used throughout the specification, claims, and figures, the acronyms below have the following definitions. Unless stated otherwise, all terms are defined by and follow the standards set forth by the Third Generation Partnership Program (3GPP) technical specifications or by the OMA (Open Mobile Alliance).

3GPP 3rd Generation Partnership Project
AP Access Point
AS Application Server
BSC Base Station Controller
BTS Base Transceiver Station
CAM Cooperative Awareness Message
CBC Cell Broadcast Centre
CBE Cell Broadcast Entity
CBM Cell Broadcast Message
CBS Cell Broadcast Service
CMAS Commercial Mobile Alert System
CSCF Call Session Control Function
DENM Decentralized Environmental Notification Message D2D Device to Device (communication)
EDGE Enhanced Data rates for GSM Evolution
ePDG Evolved Packet Data Gateway
ETWS Earthquake and Tsunami Warning System
EU-ALERT European Alert/Warning System
E-UTRA(N) Evolved Universal Terrestrial Access (Network)
GERAN GSM/EDGE Radio Access Network
GGSN Gateway GPRS Support Node
GPRS General Packet Radio Service
GRUU Globally Routable User Agent URI
GSM Global System for Mobile communications
HLR Home Location Register
HSS Home Subscriber Server
IBCF Interconnection Border Control Function
I-CSCF Interrogating CSCF
IP Internet Protocol
IMS IP Multimedia Subsystem
ISIM IP Multimedia Services Identity Module
ITS Intelligent Transport System
ITS-AID ITS Application Identifier
KPAS Korean Public Alert System
LTE Long Term Evolution
MCS Modulation and Coding Scheme
ME Mobile Equipment
MME Mobile Management Entity
MSC Mobile Switching Center
NR New generation radio access technology
P-CSCF Proxy-CSCF
PDN-GW Packet Data Network (PDN) Gateway
P-GW Packet Gateway
PLMN Public Land Mobile Network
PRB Physical Resource Block
PSCCH Physical Sidelink Control Channel
PSSCH Physical Sidelink Shared Channel
PWS Public Warning System
RAN Radio Access Network
RNC Radio Network Controller
RRC Radio Resource Control
RSU Road Side Unit
SBC Session Border Controller
SCI Sidelink Control Information
S-CSCF Serving CSCF
S-GW Serving Gateway
SGSN Serving GPRS Support Node
SIB System Information Block
TS Technical Specification
UE User Equipment
UMTS Universal Mobile Telecommunications System
URL Uniform Resource Locator
USIM Universal Subscriber Identity Module
UTRA(N) Universal Terrestrial Radio Access (Network)
V2X Vehicle-to-Everything
WLAN Wireless Local Area Network
WPAS Wireless Public Alerting Service (Canadian)

As used throughout the specification, claims, and figures, the terms below have the following definitions.

| | |
|---|---|
| Broadcast Message | Cell broadcast may be used to transport these types of messages, which may include an emergency alert message, e.g. PWS, ETWS, CMAS, WPAS, etc. |
| CAM Message | Periodically transmitted ITS messages containing information about the sender such as position, dynamics, and attributes. |
| DENM | ITS message containing information about a road hazard condition, e.g. an environmental event or traffic event. |
| PWS Message | May contain PWS, ETSW, CMAS, WPAS, and/or KPAS alert information. A PWS message may be transported using Cell Broadcast, SIB, paging message, etc. "PWS message," "PWS notification," "PWS Warning notification," and "PWS information" may be considered as equivalent terms in the context of this disclosure. |
| RRC_CONNECTED | A UE is in an RRC_CONNECTED state when an RRC connection has been established between the UE and a network element (e.g. eNB). |
| RSU | Communication equipment that serves as an interface component between vehicles or other mobile devices and roadside equipment infrastructure to support V2X applications. Typical RSU implementations may include an ME or UE, e.g., a UE-type RSU, that may act as a "UE to network relay" or support other relaying forms, and provide cellular access on one side (e.g., GERAN, UTRAN, E-UTRAN, 5G, etc.) and direct communication (e.g., D2D, PC5, Sidelink, etc.) on the other side. Typical RSU implementations may also include an eNB, e.g., an eNB-type RSU. |
| Sidelink | D2D communication technology used over the 3GPP LTE interface known as PC5. Unless otherwise stated, the terms "PC5" and "Sidelink" may be used interchangeably. |
| Warning Message | May provide timely and accurate alerts, warnings and critical information regarding disasters and other emergencies suchas, for example, "Amber" alerts, Presidential alerts and the like. Warning messages may include multiple components or fields populated with various information, e.g., a description of the event, the geographical area affected by the event, a recommended action, an expiration time for the warning message, the identity of an agency responsible for the warning message, etc. Regulatory requirements may determine the components of the warning messages. Examples of warning messages include, but are not limited to PWS, ETSW, CMAS, WPAS, and KPAS messages. |

I. System and Security Architecture of PWS

FIG. 1 depicts an example block diagram of a PWS system and security architecture 100. The architecture 100 may comprise one or more access networks (e.g., GERAN 105, UTRAN 110, E-UTRAN 115, and the like) and a core network 120. A UE 125 may connect to one or more of the access networks over a "reference point" or an air interface. In FIG. 1, for example, the UE 125 connects to a BTS in the GERAN 105 over the Um air interface; the UE 125 connects to a NodeB in the UTRAN 110 over the Uu air interface; and the UE 125 connects to an eNB in the E-UTRAN 115 over the LTE-Uu air interface. However, other interfaces between the UE 125 and access networks (e.g., GERAN 105, UTRAN 110, E-UTRAN 115, and the like) may exist and may be used to support that reference point and other reference points within the architecture 100.

Each air interface (e.g., GERAN Um, UMTS Uu, and LTE-Uu) in FIG. 1 may comprise a broadcast interface. A broadcast interface may not have security protection to ensure data integrity or authentication, as PWS Warning notification messages are typically broadcast to the UE 125 either via SYSTEM INFORMATION or via paging messages e.g., in the case of an ETWS primary notification for GERAN. In either case, no additional security is applied in current PWS architectures.

The core network 120 may comprise a packet system packet-switched (PS) core network and/or an IMS network including one or more nodes such as an MME 130 and SGSN/MSC 135. In other implementations, the core network 120 may include additional and/or alternative network nodes or network entities such as, but not limited to a GGSN, an S-GW, a P-GW, an ePDG, an HSS/HLR, a P-CSCF, an I-CSCF, an S-CSCF, an HSS, an AS, or an SBC/IBCF. The core network 120 further comprises a CBC 140 connected to each access network. For example, the CBC 140 may connect to a BSC in the GERAN 105; the CBC 140 may connect to an RNC in the UTRAN 110; and the CBC 140 may connect to the eNB in the E-UTRAN 115 via the MME 130.

The reference point used between the eNB and MME 130 is known as the "S1-MME" reference point. The reference point used between the BSC and SGSN/MSC 135 is known as the "Gb" reference point, while the reference point used between the RNC and the SGSN/MSC 135 is known as the "Iu-cs" reference point. However, other interfaces between the access networks (e.g., GERAN 105, UTRAN 110, and E-UTRAN 115) and the core network 120 may exist and may be used to support that reference point and other reference points within the architecture 100.

The CBC 140 may be connected to a CBE 145, which is assumed herein to be responsible for all aspects of formatting CBS messaging, including the splitting of a CBS message into a number of segments and the signing of such messages. Although only one CBE 145 is depicted in FIG. 1, it is possible in other embodiments for the CBC 140 to be connected to multiple CBEs.

II. Public Warning System (PWS)

PWS is used to provide timely and accurate alerts, warnings, and critical information regarding disasters and other emergencies. PWS is currently defined in 3GPP TS 23.041 without security and provides a framework for regional emergency services such as the KPAS, EU-ALERT, CMAS, and ETWS.

In CMAS or the Canadian WPAS, it is possible, but not encouraged, to include embedded URLs or phone numbers in the alert messages. An embedded URL allows a user to visit a website to obtain more rich content/features to supplement the alert. The information or message encoding used for ETWS is different from the information or message encoding used for the other systems. ETWS alerts may be PLMN-wide, cell-wide, or specific to a certain location, service, or tracking area.

In E-UTRAN, an ETWS warning alert may be provided via an ETWS primary notification and/or an ETWS secondary notification. In E-UTRAN, a CMAS warning alert may be provided via a CMAS notification. A similar air interface mechanism is used for indicating the presence of different types of warning alert notifications, that is, a paging message may contain either an ETWS indication or a CMAS indication. When receiving such a paging message, the UE (e.g., UE 125) may need to receive a first system information block (e.g., SIB1) to detect another SIB (e.g., SIB10, SIB11, or SIB12) containing the ETWS notification or the CMAS notification. Based on SIB1, the UE may determine that the other SIB is one of SIB10 (carries ETWS primary notification), SIB11 (carries ETWS secondary notification), or SIB12 (carries CMAS notification). The time it takes for the UE to receive SIB10 may be virtually the same as the time it takes for the UE to receive SIB11 or SIB12.

In UTRAN/GERAN, the primary notification is sent inside a paging message, whereas the secondary notification is sent in a CBM, which may be delayed up to a minute due to discontinuous reception (DRX). As such, the primary notification may be delivered relatively faster than the secondary notification.

Each PWS message has an identifier, e.g. a serial number, so that the UE may distinguish between different PWS messages that have been received. As part of the identifier or serial number, a number of bits (e.g., 2 bits) may be used to indicate a geographical scope of the message.

III. Vehicle-to-Everything (V2X)

V2X is a service (or a set of services) that allows vehicles to communicate with pedestrians' UEs, other vehicles, or infrastructure (or vice versa) to exchange useful information such that vehicles and pedestrians may safely traverse the road network. V2X leverages the Proximity Services (ProSe) architecture defined in 3GPP TS 23.303 with aspects specific to the V2X technology specified in 3GPP TS 23.285. One such aspect that is relevant includes a relaying entity, which may be used in the V2X architecture as a RSU.

Figure 2:
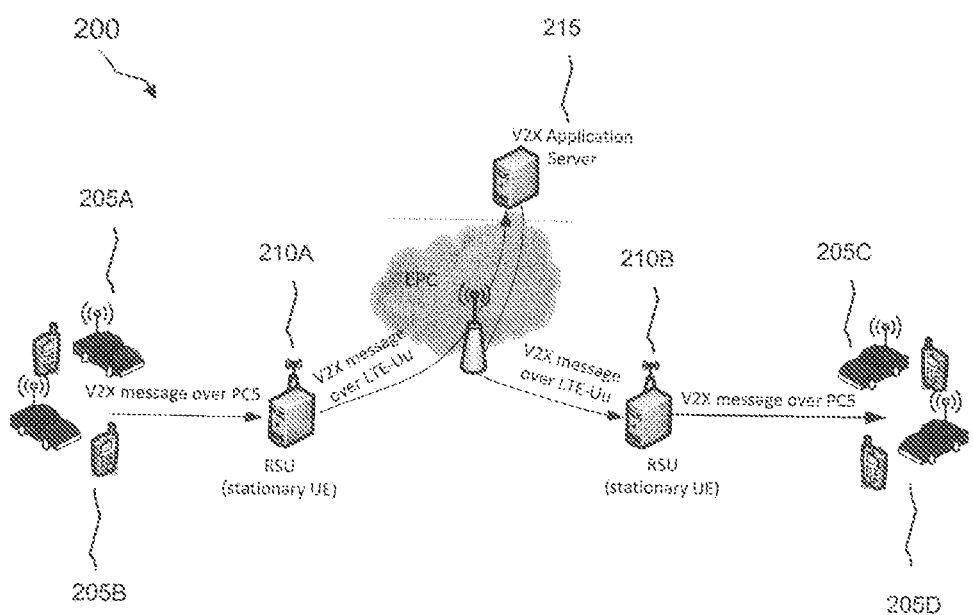
FIG. 2 illustrates an example Vehicle-to-Everything (V2X) communication system according to an embodiment of the disclosure.

FIG. 2 depicts an example architecture 200 based on the V2X technology. In this architecture 200, UEs 205A, 205B, 205C and 205D (collectively referred to as 205) may communicate with one or more other UEs 205—including UE-type RSUs 210—in proximity to one another via the PC5 interface, which may be used for both the transmission and reception of V2X messages. The UE-type RSUs 210 may communicate with one or more V2X Application Servers 215 over the LTE-Uu interface on an as needed basis, e.g., to manage the communication of V2X messages beyond the direct PC5 communication range. While the V2X Application Server 215 is depicted in an evolved packet core (EPC) network, the V2X Application Server 215 may be deployed in any suitable network. One will also appreciate that the diagram is representative of an LTE network but is equally applicable to a 5G system where there is one interface from the UE 205 to the RSU 210 and another interface from the RSU 210 to a Core Network via a Base Station.

IV. D2D/Sidelink Communications

Sidelink communication allows an authorized UE to communicate with other UEs or radio equipment (e.g., RSUs or relays) e.g., when there is no cellular coverage, or to avoid the use of radio resources in a licensed spectrum or the exhaustion of the traffic capacity of a cellular network. This is achieved by using direct communications between UEs or between a UE and another radio equipment. Sidelink communications are typically performed over a radio interface known as the PC5 interface. A UE that is out of coverage of—or not directly connected to—an infrastructure or to a network may further communicate with this infrastructure or this network through an RSU or a relay by using Sidelink communications.

A UE may discern that a message received over Sidelink is for a certain V2X application based on a destination Layer-2 ID used for the message. Although Layer-2 ID code point values may not be defined in 3GPP specifications, 3GPP TS 23.285 specifies that the Layer-2 ID is configured to the UE for V2X communications over the PC5 interface.

V. Sidelink Communications for V2X

With respect to ProSe Sidelink communications, V2X Sidelink transmission/reception is based on resource pools that may be pre-configured in the UE (e.g., resources that can be used if the UE is out of coverage), configured by Uu broadcast (e.g., system information messages), or by Uu dedicated information (e.g., connected mode signalling).

Certain resource pools may be used only in certain conditions. For example, some resource pools may be associated with geographical locations, while exceptional resource pools may be used during mobility between cells or geographical zones. Resources in a pool may be defined in terms of allowed subframes (offset, bitmaps) and frequencies (e.g., PRBs).

Moreover, Sidelink transmissions may be subject to resource sensing, transmission parameters such as MCS, PRB number, retransmission number, a UE-specific parameter (e.g., dependent on the UE absolute speed), and the synchronization reference type (i.e., Global Navigation Satellite System (GNSS), eNB, or UE) in UE autonomous resource selection. A transmission occurrence such as the transmission of a V2X message may involve a control part (e.g., SCI) transmitted in a PSCCH and an associated data part transmitted in a PSSCH. The PSCCH and associated PSSCH may occur in the same subframe or in different subframes.

SCI format 1 defined for V2X Sidelink communication contains information for properly handling the corresponding data part. Such information may include priority, frequency resource location, time gap before retransmission, and MCS. Note that SCI format 0 is used for ProSe Sidelink communications.

A UE supporting V2X Sidelink communications may operate in one of two modes of resource allocation. A first mode may be described as a network scheduled resource allocation (or Sidelink mode 3), where the UE needs to be in an RRC_CONNECTED state in order to transmit data. When operating in the network scheduled resource allocation mode, the UE requests transmission resources from an eNB, which schedules such resources for transmission of Sidelink control information and data.

A second mode may be described as an autonomous resource selection (or Sidelink mode 4), where the UE may autonomously select resources from resource pools and performs transport format selection to transmit Sidelink control information and data. If mapping between the zones and V2X Sidelink transmission resource pools is configured, the UE selects a V2X Sidelink resource pool based on the zone in which the UE is located. When operating in the autonomous resource allocation mode, the UE may perform sensing for selection (or reselection) of Sidelink resources. Based on sensing results, the UE may select (or reselect) some specific Sidelink resources and may reserve multiple Sidelink resources. The UE is allowed to perform up to two parallel independent resource reservation processes. The UE is also allowed to perform a single resource selection for its V2X Sidelink transmission.

VI. V2X Application Layer

The V2X application layer carries information between various V2X applications that may reside in cars, in roadside units, or in pedestrian devices. The European Telecommunications Standards Institute (ETSI) has defined an ITS covering a framework of messages that may be sent and received by these various entities. The messages are split into different types, including CAM and DENM. CAMs are messages that are periodically transmitted, containing information about the sender such as, but not limited to, position, dynamics, and attributes. DENMs are messages that may, but are not limited to, contain information about a road hazard condition, e.g., an environmental event or traffic event. Additional details regarding CAMs and DENMs may be found in ETSI EN 302 637-2 and ETSI EN 302 637-3, respectively.

As previously mentioned, cellular networks may deliver broadcast information such as PWS messages used in cases of emergencies e.g., an earthquake, tornado, etc. Under current PWS architectures, the delivery of such information is limited to a device (e.g., a UE) such as a smartphone camped on a cellular network. However, it is expected that some devices will not connect directly to a network, but will instead use D2D communications, e.g., by means of a relaying entity. An example may include an automobile using D2D to communicate to a road traffic infrastructure that acts as a relaying entity with the network. Types of these automobiles may include, but are not limited to automobiles with pre-installed V2X functionality based on Sidelink communication, or to conventional automobiles (e.g., non-native V2X cars) that install an aftermarket Sidelink V2X functionality module. Such devices (e.g., V2X-equipped cars or vehicular UEs in cars) cannot receive PWS messages as the transmission of PWS over Sidelink has not been specified in existing standards.

Nonetheless, it would be desirable for vehicles to take into account certain information such as transportation alerts (e.g., a nearby road is flooded), weather alerts (e.g., a severe tornado is approaching), traffic information or crime reports (e.g., an incident associated with a car having license plate "XYZ"). This information might be used by a car system itself to adapt the car's behaviour. For example, upon receiving an alert reporting icy road conditions, the car system may cause the car to activate a traction mechanism, consider alternative routes, increase overall safety performance, etc.

Moreover, because V2X-equipped cars can broadcast data using Sidelink, one car may receive communications from other cars within radio coverage distance. However, existing V2X applications do not allow a V2X-equipped car to relay or rebroadcast PWS information received from a cellular network to other cars in the vicinity of the V2X-equipped car.

VII. Relaying PWS Information Received from Cellular Network

The embodiments disclosed herein address the limitations discussed above with respect to existing V2X applications. In an embodiment, a UE is configured to receive a PWS message from a network node. Upon receiving the PWS message, the UE may determine whether any rules apply according to a policy associated with PWS messages. The UE may then relay the PWS message, subject to the policy, to a remote UE. If the PWS message comprises a primary PWS notification, the UE may repeat the foregoing procedure upon receiving a secondary PWS notification associated with the primary PWS notification.

Figure 3:
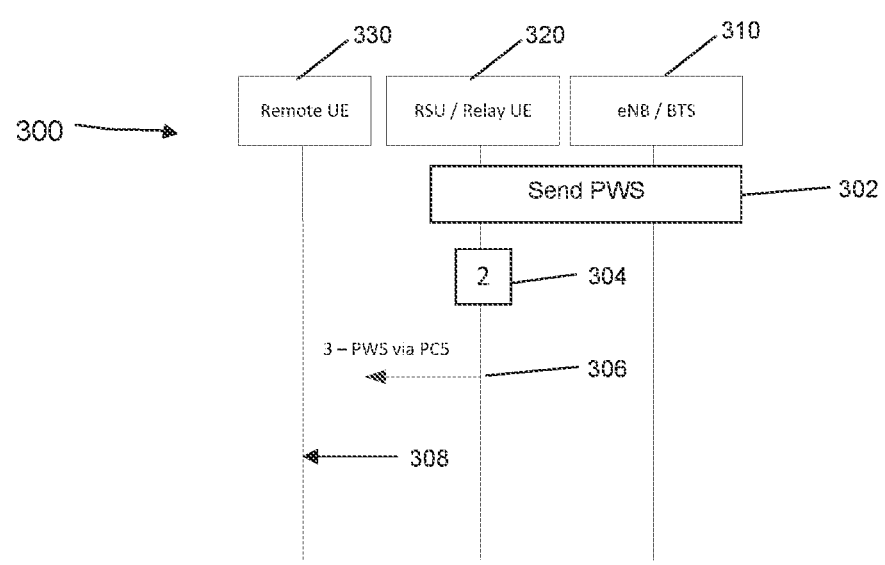
FIGS. 3 and 4 are example flow diagrams for relaying Public Warning System (PWS) messages according to embodiments of the disclosure.

The steps associated with the procedure mentioned above are pictorially represented in the example flow diagram 300 in FIG. 3. At block 302, a network node 310 (such as, but not limited to, a NodeB, an eNB, a BTS, a BSC, an RNC, an access point, or any combination thereof) sends a PWS message containing PWS information. The PWS information may be contained in a SIB, a paging message, a CBM, any of these being further referred to as a broadcast message in the rest of this specification, or combination thereof. At block 304, the PWS message is received by a communications device 320, which may include any suitable device capable of communicating such as, but not limited to, a user equipment (UE), a mobile station, a relay UE, an RSU, a network node (e.g., similar to network node 310), etc.

In an embodiment, the UE 320 may be configured to communicate using two or more different technologies. For example, the UE 320 may be configured to communicate with a telecommunications network using cellular technologies such as, but not limited to, mobile/cellular (e.g., CDMA2000, GSM/GPRS/EDGE, UMTS/UTRA, LTE/E-UTRA, etc.) or a new generation Radio Access technology such as NR. Mobile cellular technologies such as CDMA2000, GSM/GPRS/EDGE, UMTS/UTRA, and LTE/E-UTRA may alternatively be designated by a corresponding RAN type, e.g., CDMA2000 RAN, GERAN, UTRAN, E-UTRAN or new generation RAN, respectively. These mobile cellular technologies may sometimes be designated by technology generations numerals such as "2G" (second generation) mobile cellular technologies, "3G" (third generation) mobile cellular technologies, "4G" (fourth generation) mobile cellular technologies, "5G" (fifth generation) mobile cellular technologies, and so forth. The UE 320 may also be configured to communicate with other UEs using an alternative technology such as, but not limited to, PC5/Sidelink, D2D, V2X, Wi-Fi®/WLAN (e.g., IEEE 802.11-based technologies), Bluetooth, Near-field communication (NFC), WiMAX, wireless chargers, Ethernet, cable modem, digital subscriber line (DSL), fiber, Universal Serial Bus (USB), and wireless.

Prior to taking further action subsequent to receiving the PWS message, the UE 320 may consult a policy to determine whether any restrictions apply with respect to handling the PWS message. For instance, the policy may specify one or more of the following rules: (a) the UE is only permitted to relay the PWS message over a certain interface (e.g., the PC5 interface, technology, band within a technology, or other suitable interface that supports D2D communications); (b) the UE is only permitted to relay the PWS message if it is a certain type of broadcast message (e.g., an Amber alert, a presidential alert, an earthquake alert, a tsunami alert, etc.); or (c) the UE is to relay part of the PWS message based upon a technology on which the PWS was received. In some implementations, one or more of these rules may be optional.

At operation 306, the UE 320 relays (e.g. transmits or broadcasts) the PWS message in accordance with the rules discussed above. At operation 308, the PWS message relayed by the UE 320 is received by a remote UE 330, which may not utilize a cellular connection to communicate with the UE 320. In some aspects, the UE 320 may be provided configuration information containing a destination Layer-2 ID, which may be provisioned to the UE 320 internally, via a SIM card, application on a U ICC, via a network interface, or via any other appropriate means. The UE 320 may then associate this destination Layer-2 ID to the PWS message (or other suitable type of warning message, e.g., either now known or later developed) received at block 304 according to the configuration information, and relay this PWS message accordingly at operation 306. If the PWS message sent at block 302 comprises a primary PWS notification, the flow diagram 300 may be repeated upon the network node 310 sending another PWS message containing a secondary PWS notification associated with the primary PWS notification. In some embodiments, the secondary PWS notification may include an explanatory text component such as information describing the location of the emergency identified in the primary PWS notification, information describing the severity of the emergency identified in the primary PWS notification, an update regarding the emergency identified in the primary PWS notification, etc.

The following discussion provides additional details regarding the embodiments described above with respect to FIG. 3. For the purpose of clarity, it is to be understood that any one of the embodiments disclosed herein may be combined with any one or more of the other embodiments disclosed herein to create a new embodiment within the scope of the present disclosure. It is also to be understood that while the following discussion may focus on embodiments involving motorized vehicles, the disclosed embodiments are similarly applicable to any device capable of communicating with a network, e.g., mobile phones, smartwatches and wearables as well as smart appliances such as refrigerators, washer and dryers, ovens, ranges, heating and cooling systems, coffee makers, alarm systems, laundry machines, dishwashers, etc.

Figure 4:
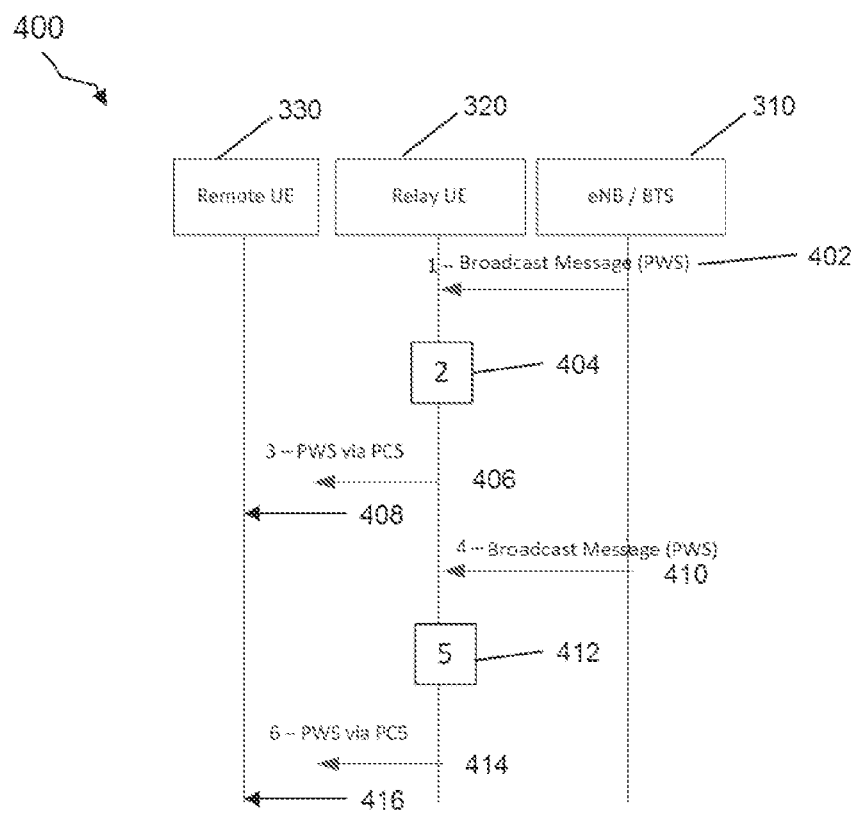

VIII. Relaying PWS Information Received on a Cellular Network Over Short Range Technology as a Specific PWS Message Service FIG. 4 depicts an example flow diagram 400 for relaying PWS information according to an embodiment of the present disclosure. At operation 402, the network node 310 sends the relay UE 320 a broadcast message comprising a PWS notification over a first telecommunications technology network type, such as GERAN, UTRAN, E-UTRAN, new generation RAN, etc. In some implementations, the broadcast message may convey PWS notification information in any of the following: a warningType information element (IE); a warningMessageSegment IE such as defined in 3GPP TS 36.331; one or more other IEs; or any combination thereof. In some implementations, the broadcast message sent at operation 402 may convey notifications from other alert systems, such as but not limited to KPAS or EU-ALERT.

In some implementations, the relay UE 320 may be configured to determine whether or not the relay UE 320 is permitted to receive and/or relay warning messages or part or all of their contents. For example, the relay UE 320 may be provisioned with a policy comprising configuration information to be used by the relay UE 320 to determine what actions, if any, the relay UE 320 may perform with respect to warning messages. A non-limiting example of such configuration information 500 is depicted in FIG. 5. In other aspects, the configuration information 500 may include additional and/or alternative access conditions, data items, coding, etc.

The configuration information 500 may include an elementary file (EF) 510 indicating which services are available with respect to PWS messages. The EF 510 comprises multiple fields such as a File Identifier (e.g., '6Fxx'), a Structure field describing the structure of the EF (e.g., transparent, cyclic, linear fixed, or linear variable), a Status field (e.g., optional (O), mandatory (M), or conditional (C)), a File size field indicating the size of the EF, an Update activity field (e.g., low or high), etc. The EF 510 further comprises a set of Access Conditions such as READ, UPDATE, ACTIVATE, and DEACTIVATE.

If it is determined that the relay UE 320 is permitted to receive and/or relay warning information (e.g., based on the configuration information 500), the relay UE 320 may activate a feature to promote reception of broadcast messages containing PWS notifications or the like. In some implementations, the relay UE 320 may be configured to receive and send such messages by default. For discussion purposes, it may be assumed that the relay UE 320 is so permitted/configured, and thus, the broadcast message sent by the network node 310 is received by the relay UE 320 at operation 402.

Upon receiving the broadcast message, the relay UE 320 may consult the configuration information 500 to determine whether the relay UE 320 is permitted to access contents of the broadcast message. The configuration information 500 may further include one or more bytes of coding information 520, where one more bits in the first byte may be used to determine whether or not broadcast messages may be relayed.

For example, the relay UE 320 may be configured to either relay or ignore all PWS messages that it receives in a home PLMN (HPLMN) and equivalent PLMNs if the first bit "b1" is set either to "0" or "1," respectively. Similarly, the relay UE 320 may be configured to either relay or ignore all PWS messages that it receives in visited PLMNs (VPLMNs) if the second bit "b2" is set either to "0" or "1," respectively. In other aspects, the coding information 520 may include additional and/or alternative bits. If the relay UE 320 is configured to ignore all PWS messages in the HPLMN (e.g., "b1"="1") or VPLMNs (e.g., "b2"="1"), the relay UE 320 simply does not perform the reception of warning messages, in which case the broadcast message is not received at operation 402.

As previously mentioned, each PWS message may have a serial number used to distinguish between different PWS messages. Each PWS message may also have a message identifier identifying the source of the PWS message. Thus, upon receiving the broadcast message comprising a PWS notification, the relay UE 320 may use such information to determine whether the relay UE 320 has received the PWS notification more than once. If so, the relay UE 320 may silently discard the PWS notification. In some embodiments, the broadcast message received at operation 402 may comprise a parameter indicating that the PWS notification is a particular type of warning message.

For example, assuming the broadcast message from the network node 310 conveys the PWS notification in an ETWS IE, the broadcast message may comprise a warning type parameter indicating that the PWS notification corresponds to an earthquake, a tsunami, a test sent for testing purposes, etc. If the warning type parameter indicates that the PWS notification is a test, the relay UE 320 may be configured to silently discard the PWS notification. Otherwise, the relay UE 320 may proceed to block 404 and generate a first PWS output message, which may be used to relay (in operation 406) the PWS notification over a different communication technology than that over which the broadcast message was received at operation 402.

In some embodiments, the contents of the PWS output message generated at block 404 may depend upon the manner in which the PWS notification was conveyed in the broadcast message received at operation 402. For example, assuming the PWS notification is conveyed in the ETWS IE as discussed above, the relay UE 320 may format the PWS output message to include one or more parameters contained in the ETWS IE. In some implementations, the relay UE 320 may format the PWS output message to include an optional "Rebroadcast Indication" parameter (e.g., a rebroadcast flag).

FIG. 6 depicts one possible implementation of a data structure 600 including the contents of the PWS output message generated at block 404. The "Warning Type" 605 and "Serial Number" 615 parameters may be as received in the ETWS IE. If the PWS message corresponds to an ETWS primary notification, the data structure 600 may include a "Message Identifier" 610 identifying the source of the ETWS primary notification message. In other implementations, the contents of the PWS output message may be included in an eXtensible Markup Language (XML) data structure.

In some embodiments, the data structure 600 in FIG. 6 may be modified depending on a type of radio access technology (RAT) over which the relay UE 320 receives the broadcast message at operation 402. For example, FIG. 7 depicts one possible implementation of a data structure 700 to which the data structure 600 may be modified if the broadcast message is received at operation 402 over a GERAN; FIG. 8 depicts one possible implementation of a data structure 800 to which the data structure 600 may be modified if the broadcast message is received at operation 402 over a UTRAN; and FIG. 9 depicts one possible implementation of a data structure 900 to which the data structure 600 may be modified if the broadcast message is received at operation 402 over an E-UTRAN or a new generation RAN. In other implementations, the data structure 600 may be modified according to any suitable telecommunications technology.

At operation 406, the relay UE 320 may send the PWS output message containing the PWS notification over a PC5 interface. However, it is to be understood that in other examples, the PWS message may be sent over other suitable interfaces such as an interface designed for a short range communication technology (e.g., Dedicated Short Range Communications (DSRC), IEEE 802.11p, Bluetooth, WLAN, etc.). At operation 408, the remote UE 330 receives the PWS message, e.g., over the PC5 interface.

In some embodiments, the relay UE 320 may be configured to determine whether a secondary notification is available. For example, if the PWS notification conveyed by the original broadcast message at operation 402 corresponds to an ETWS primary notification, the network node 310 may send to the relay UE 320 a second broadcast message containing an EWTS secondary notification related to the ETWS primary notification at operation 410. In other examples, the broadcast message sent at operation 410 may contain a different type of PWS notification than the EWTS secondary notification.

The relay UE 320 may receive the second broadcast message containing the PWS notification over the first telecommunications technology. For example, if the first telecommunications technology network type comprises GERAN or UTRAN, the relay UE 320 may receive the PWS notification via a CBM. Alternatively, if the first telecommunications technology network type comprises an E-UTRAN, the relay UE 320 may receive the PWS notification via a SIB (e.g., SIB11).

At block 412, the relay UE 320 may generate a second output PWS message containing the PWS notification received at operation 410. The second PWS output message may comprise a data structure similar to data structure 600. Like the first PWS output message, the data structure of the second PWS output message may be modified based upon the first telecommunications technology over which the broadcast message was received at operation 410, e.g., according to data structures 700, 800, and 900. Additionally or alternatively, the data structure of the second PWS message may be modified based upon the contents of the broadcast message itself.

Like the first PWS output message, the relay UE 320 may format the data structure of the second PWS output message based upon the first telecommunications technology over which the broadcast message was received. Thus, if the broadcast message is received over GERAN, the relay UE 320 may format the data structure of the second PWS output message according to data structure 700. In an embodiment, the relay UE 320 may be configured to modify the data structure of the second PWS output message based upon examining a "Message Identifier" 610 within the broadcast message received at operation 410.

For example, the data structure of the second PWS output message may be modified such that: (i) if the received PWS message identifier 610 is comprised in a first set of values (e.g., "1100Hex" and "1107Hex"), the relay UE 320 may set a "Data Coding Scheme" parameter 715 in FIG. 7 to a predetermined value (e.g., "101") and include the contents of the received broadcast message "Serial Number" 705 onwards in the PWS output message (e.g., Serial Number 705, Message Identifier 710, Data Coding Scheme 715, Page Parameter 720, and Content of Message 725, as shown in FIG. 7); (ii) if the received PWS message identifier 610 is comprised in a second set of values (e.g., "1112(Hex)" and "112B(Hex)"), the relay UE 320 may set a "Data Coding Scheme" parameter 715 to another predetermined value (e.g., "102") and include the contents of the received broadcast message from "Serial Number" 705 onwards in the PWS output message (e.g., as shown in FIG. 7).

If the broadcast message is received at operation 410 over UTRAN, the relay UE 320 may format the data structure of the second PWS output message according to data structure 800. In an embodiment, the relay UE 320 may modify the data structure of the second PWS output message based upon the "Message Identifier" 610 within the broadcast message received at operation 410. For example, the data structure of the second PWS output message may be modified such that: (i) if the received PWS message identifier 610 is comprised in a first set of values (e.g., "1100(Hex)" and "112B(Hex)"), the relay UE 320 may set a "Data Coding Scheme" parameter 820 in FIG. 8 to a predetermined value (e.g., "103") and include the contents of the received broadcast message from "Message Type" 805 onwards in the PWS output message (e.g., Message Type 805, Message Identifier 810, Serial Number 815, Data Coding Scheme 820, and cell broadcast (CB) Data 825, as shown in FIG. 8).

If the broadcast message is received at operation 410 over E-UTRAN, the relay UE 320 may format the data structure of the second PWS output message according to data structure 900. In an embodiment, the relay UE 320 may modify the data structure of the second PWS output message based upon the "Message Identifier" 610 within the broadcast message received at operation 410. For example, the data structure of the second PWS output message may be modified such that: (i) if the received PWS message identifier is comprised in a first set of values (e.g., "1100(Hex)" and "1107(Hex)"), the relay UE 320 may set a "Data Coding Scheme" parameter 920 in FIG. 9 to a predetermined value (e.g., "104") and include the contents of the received broadcast message from "Message Identifier" 905 onwards in the PWS output message (e.g., Message Identifier 905, Serial Number 910, CB Data 915, and Data Coding Scheme 920, as shown in FIG. 9); (ii) if the received PWS message identifier is comprised in a second set of values (e.g., "1112(Hex)" and "112B(Hex)"), the relay UE 320 may set a "Data Coding Scheme" parameter 920 to another predetermined value (e.g., "105") and include the contents of the received broadcast message from "Message Identifier" 905 onwards in the PWS output message (e.g., as shown in FIG. 9).

Additionally or alternatively, the relay UE 320 may modify the data structure of the second PWS output message based upon the "Serial Number" parameter 615 contained in the broadcast message received at operation 410. For example, if a Geographical Scope of the "Serial Number" parameter 615 indicates that the geographical area of the PWS message is PLMN wide, the relay UE 320 may set a "Rebroadcast" parameter in the data structure of the second PWS output message to "True." In some implementations, setting "Rebroadcast" parameter to "True" may be inferred to mean that the PWS message may be rebroadcasted irrespective of the geographical area.

In some embodiments, the Geographical Scope of the "Serial Number" parameter 615 may indicate that the geographical area of the PWS message is specific to a unique area. In such cases, the relay UE 320 may modify the data structure of the second PWS output message to indicate that the PWS message is only applicable within a certain geographical area.

Upon finalizing the data structure of the second PWS output message, the relay UE 320 may proceed to send the second PWS output message containing the PWS notification over a PC5 interface, as shown in operation 414. In other implementations, the second PWS output message may be sent over any suitable interface such as previously mentioned with respect to the first PWS output message sent at operation 406.

At operation 416, the remote UE 330 receives the second PWS output message containing the encoding as described above. In an embodiment, the remote UE 330 may subsequently display a notification on a screen and/or generate an audible alert to notify a user of the remote UE 330 of the second PWS output message. Additionally or alternatively, the remote UE 330 may rebroadcast the data received in the second PWS output message. For example, if the second PWS output message contains a rebroadcast flag set to "True," the remote UE 330 may rebroadcast the data in a subsequent PC5 message. However, the remote UE 330 may set the rebroadcast flag in the subsequent PC5 message to "False."

In an embodiment, the relay UE 320 may be configured to continue performing the functionality described above each time the relay UE 320 receives a warning message (e.g., a broadcast message containing a primary or secondary PWS notification) from the network node 310.

In some embodiments, the relay UE 320 (or functions thereof) may be combined with the network node 310. In such embodiments, the total number of blocks or operations in the flow diagram 400 may be reduced, as any tasks that would otherwise be performed by the relay UE 320 may be performed by the network node 310, which may directly communicate with the remote UE 330 over the PC5 interface (or other suitable interface).

In an embodiment, the relay UE 320 may be configured to provide an indication that messages sent over the PC5 interface (e.g., the first and second PWS messages at operations 406 and 414) contain a PWS message. For example, such an indication may be provided using specific ITS application identifiers (ITS-AIDs), which may be assigned to PWS services (or to the derivative technologies). FIG. 10 depicts one possible implementation of how a PWS message may be indicated using ITS-AIDs, such as denoted by the underlined text.

Figure 17:
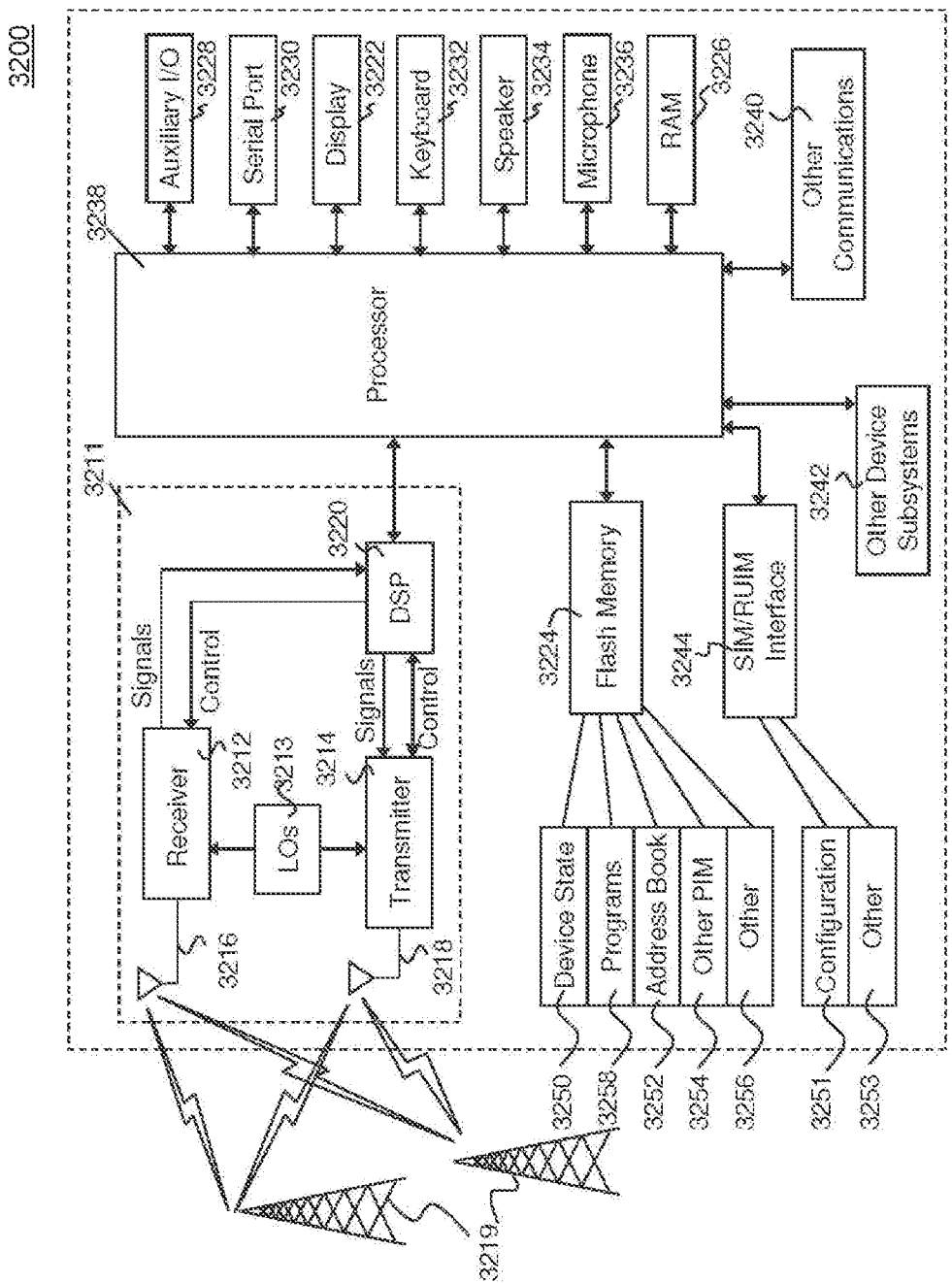
FIG. 17 is a block diagram showing an example user equipment capable of being used with the systems and methods in the embodiments described herein.

As another example, the relay UE 320 may provide an indication that messages sent over the PC5 interface contain a PWS message using a destination Layer-2 ID, which may be assigned to a PWS application over a V2X Sidelink interface. In this example, the portion containing PWS data may be transmitted over the PSSCH as V2X information and contain the corresponding PWS message(s). The Layer-2 ID may be configured in an internal memory of a ME (e.g., via OMA data management (DM)) or stored on a UICC/USIM/ISIM of a UE (e.g., relay UE 320 and remote UE 330). FIG. 11 depicts one possible implementation of configuration information 1100 indicating how a destination Layer-2 ID may be used to indicate a PWS message. In this embodiment the ME reads the $EF_{RelayPWSLayer2id}$ to determine what Layer-2 ID is used for PWS messages. The relay UE 320 may use this Layer-2 ID in operations 406 and 414 shown in FIG. 4. The remote UE 330 will read $EF_{RelayPWSLayer2id}$ from UICC as stored in internal memory (e.g., random access memory (RAM) 3226, flash memory 3224, or SIM/RUIM interface 3244 in FIG. 17). Upon receipt of a message over PC5 e.g., operations 408 and 416 of FIG. 4, remote UE 330 reads the Layer-2 ID and if it matches the Layer 2-ID stored in the ME memory (e.g., RAM 3226, flash memory 3224, or SIM/RUIM interface 3244), the ME knows it has received a PWS message.

In an embodiment, PWS message identifiers may be defined as specific message types that may be conveyed as part of an ITS PDU header. FIG. 12 depicts one possible implementation in which PWS message identifiers may be defined as specific message types conveyed as part of an ITS PDU header specified by Annex "A.114 DF_ItsPduHeader" in ETSI TS 102 894-2 V1.2.1 (2014-09), which is incorporated herein by reference, with changes denoted by underlined text. This way, a PWS message may not only coexist with different or other ITS/V2X messages on a given interface, but may also be used concurrently as part of different services (e.g., PWS may be received as a component of a Decentralized Environmental Notification (DEN) service).

In an embodiment, an application-layer indicator may be provided if different PWS message sub-categories are specified or defined (e.g., according to the first cellular technology over which PWS messages originate). For example, an application-layer indicator may take the form of a byte containing code points or values that identify the first (source) cellular technology network type (e.g., GERAN, UTRAN, E-UTRAN, etc.). FIG. 13 depicts one possible implementation in which ETSI TS 102 894-2 V1.2.1 may be extended to include encoding to identify a source technology of a PWS message (e.g., such as those received at operations 402 and 410 of FIG. 4). For example, a first field may carry an indicator identifying the first cellular technology and a second field may carry the PWS message encoded according to that first cellular technology identified by the indicator. In an example, if a PWS message was received by an RSU over GERAN, that message when sent over PC5 would result in the following encoding: source technology having a value 1 (GERAN) and PWS message containing the PWS message coded according to FIG. 7 (GERAN).

In an embodiment, a resource pool may comprise a generic pool used for combined V2X service, or a pool dedicated for PWS services. Moreover, the pool configuration (e.g., resource size and periodicity) and transmission parameters may be adapted according to PWS specifications.

Figure 14:
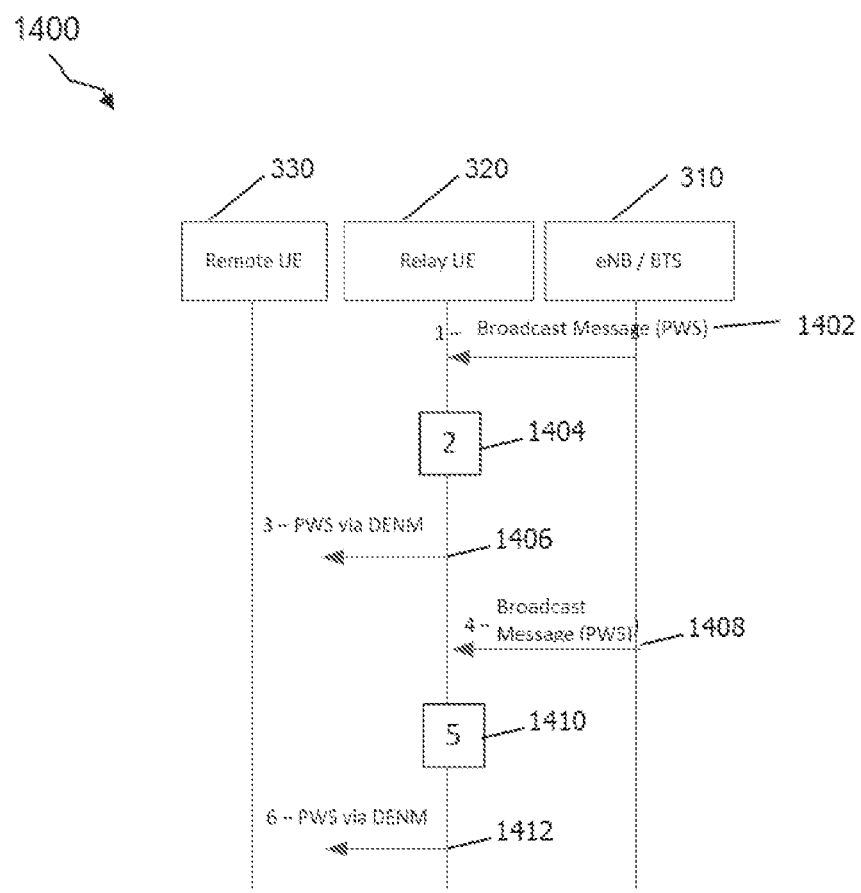
FIG. 14 is an example flow diagram for relaying PWS messages according to embodiments of the disclosure.

VIII. Relaying PWS Information Received on a Cellular Network Over Short Range Technology within an Existing V2X Service FIG. 14 depicts a flow diagram 1400 for relaying PWS information according to another embodiment of the present disclosure. At operation 1402, the network node 310 sends the relay UE 320 a first broadcast message comprising a PWS notification over a first telecommunications technology network type, such as GERAN, UTRAN, E-UTRAN, etc., similar to the broadcast message sent at operation 402 in FIG. 4. In some implementations, the broadcast message may convey notifications from other alert systems, such as but not limited to KPAS or EU-ALERT.

Moreover, the relay UE 320 may utilize configuration information 500 in a similar manner as described above with respect to FIG. 4. Based on such configuration information 500, the relay UE 320 may determine that it is permitted to receive and/or relay the warning information sent at operation 1402. The relay UE 320 may also ignore PWS messages under similar conditions as those described above with respect to FIG. 4 (e.g., when a PWS message is received more than once, when a PWS message corresponds to a test, when PWS messages are to be ignored, etc.).

At block 1404, the relay UE 320 may generate a first output PWS message, which may be used to relay the PWS notification over a different communication technology than that over which the broadcast message was received at operation 1402. In one implementation, the first PWS output message generated at block 1404 may be substantially similar to the PWS message generated at block 404 in FIG. 4, i.e., the PWS message may include a "Warning Type" parameter 605, a "Serial Number" parameter 615, and an optional "Rebroadcast Indication" parameter (not shown). Additionally or alternatively, the first PWS output message generated at block 1404 may be formatted at least partly depending on a "Message Identifier" 610 contained in the broadcast message received at operation 1402.

In another implementation, the first PWS output message may be generated at block 1404 with content containing an ETWS IE (e.g., if received), and a "Data Coding Scheme" parameter set to a value depending on a first communication technology over which the broadcast message was received at operation 1402. For example, if the broadcast message was received at operation 1402 over GERAN, the relay UE 320 may set the "Data Coding Scheme" parameter 715 in FIG. 7 to a first value (e.g., "102"); if the broadcast message was received at operation 1402 over UTRAN, the relay UE 320 may set the "Data Coding Scheme" parameter 820 in FIG. 8 to a second value (e.g., "103"); and if the broadcast message was received at operation 1402 over E-UTRAN, the relay UE 320 may set the "Data Coding Scheme" parameter 920 in FIG. 9 to a third value (e.g., "105").

FIG. 15 depicts one possible implementation of a data structure 1500 including the contents of the first PWS output message generated at block 1404. The data structure 1500 corresponds to the DENM format defined by ETSI TS 102 637-3 V1.1.1 (2010-09), with changes proposed herein denoted by underlined text. At operation 1406, the relay UE 320 transmits the first PWS output message, which is then received by the remote UE 330, wherein PWS message is transmitted as a DENM over a different communication technology than that over which the broadcast message was received at operation 1402. In an embodiment, the different communication technology over which the DENM is transmitted comprises a V2X transmission technology.

As previously discussed, the relay UE 320 may be configured to determine whether a second warning message is available after transmitting the PWS message at operation 1406. At operation 1408, for example, the network node 310 may send the relay UE 320 a second broadcast message containing a PWS notification (e.g., a secondary notification related to the PWS notification received in the broadcast message at operation 1402, or a new warning notification). If the first telecommunications technology network type comprises GERAN or UTRAN, the relay UE 320 may receive the PWS notification via a CBM. Alternatively, if the first telecommunications technology network type comprises an E-UTRAN, the relay UE 320 may receive the PWS notification via a SIB (e.g., SIB11).

At block 1410, the relay UE 320 may generate a second PWS output message containing the PWS notification received at operation 1408. The second PWS output message may comprise a data structure similar to data structure 600, and the data structure may be modified based upon the first telecommunications technology over which the broadcast message was received at operation 1408, e.g., according to data structures 700, 800, and 900. Additionally or alternatively, the data structure of the second PWS output message may be modified based upon the contents of the broadcast message itself.

If the broadcast message is received at operation 1408 over GERAN, the relay UE 320 may format the data structure of the second PWS message according to data structure 700. In an embodiment, the relay UE 320 may be configured to modify the data structure of the second PWS output message based upon examining a "Message Identifier" 610 within the broadcast message received at operation 1408. For example, if the broadcast PWS message is received over GERAN, the relay UE 320 may examine the message identifier 610 and modify the data structure of the second PWS message such that: (i) if the message identifier is comprised in a first set of values (e.g., "1100Hex" and "112BHex"), the relay UE 320 may set a "Data Coding Scheme" parameter (e.g., Data Coding Scheme 715 in FIG. 7) to a first value (e.g., "101") and include the contents of the received broadcast message (e.g., from "Serial Number" 705 onwards in FIG. 7) in the PWS output message. In an embodiment, the contents of the broadcast message received at operation 1408 may be included in the "Content of Message" field 725 shown in FIG. 7.

If the broadcast message is received at operation 1408 over UTRAN, the relay UE 320 may format the data structure of the second PWS output message according to data structure 800. In an embodiment, the relay UE 320 may be configured to modify the data structure of the second PWS output message based upon examining a "Message Identifier" 610 within the broadcast message received at operation 1408. For example, if the broadcast message is received over UTRAN, the relay UE 320 may examine the message identifier 610 and modify the data structure of the second PWS output message such that: (i) if the message identifier is comprised in a first set of values (e.g., "1100 (Hex)" and "112B(Hex)"), the relay UE 320 may set a "Data Coding Scheme" parameter (e.g., Data Coding Scheme 820 in FIG. 8) to a first value (e.g., "101") and include the contents of the received broadcast message (e.g., from "Message Type" 805 onwards in FIG. 8) in the output PWS message. In an embodiment, the contents of the broadcast message received at operation 1408 may be included in the "CB Data" field 825 shown in FIG. 8.

If the broadcast message is received at operation 1408 over E-UTRAN, the relay UE 320 may format the data structure of the second PWS output message according to data structure 900. In an embodiment, the relay UE 320 may be configured to modify the data structure of the second PWS output message based upon examining a "Message Identifier" 610 within the broadcast message received at operation 1408. For example, if the broadcast message is received over E-UTRAN, the relay UE 320 may examine the message identifier 610 and modify the data structure of the second PWS output message such that: (i) if the message identifier is comprised in a first set of values (e.g., "1100 (Hex)" and "112B(Hex)"), the relay UE 320 may set a "Data Coding Scheme" parameter (e.g., Data Coding Scheme 920 in FIG. 9) to a first value (e.g., "101") and include the contents of the received broadcast message (e.g., from "Message Identifier" 905 onwards in FIG. 9) in the PWS output message. In an embodiment, the contents of the received broadcast message received at operation 1408 may be included in the "CB Data {Warning Message Content E-UTRAN}" field 915 shown in FIG. 9.

At operation 1412, the relay UE 320 transmits the second PWS output message, which is further received by the remote UE 330, wherein the second PWS output message is transmitted as a second DENM over a different communication technology than that over which the broadcast message was received at operation 1408. In an embodiment, the different communication technology over which the second DENM is transmitted comprises a V2X transmission technology.

In some embodiments, the relay UE 320 may determine that a geographical area of a particular PWS message (e.g., such as received at operation 1402 or 1408) is PLMN wide. In such cases, the relay UE 320 may send an indication to the remote UE 330 over the different communication technology to indicate that the PWS message may be rebroadcasted. In one implementation, the relay UE 320 may provide such an indication using a rebroadcast flag in a PWS message. Upon receiving such indication, the remote UE 330 may determine to rebroadcast that PWS message in a subsequent V2X message.

In an embodiment, the relay UE 320 may be configured to continue performing the functionality described above each time the relay UE 320 receives a warning message (e.g., a broadcast message containing a primary or secondary PWS notification) from the network node 310. In some embodiments, the relay UE 320 (or functions thereof) may be combined with the network node 310 such as previously described with respect to flow diagram 400.

Figure 16:
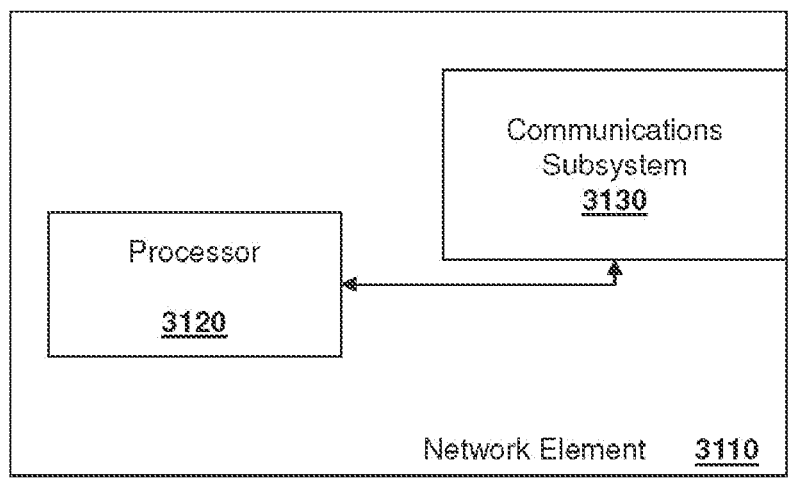
FIG. 16 is a block diagram of an example network element according to one embodiment.

The various methods or operations described herein may be implemented by a network element. An example network element is shown with regard to FIG. 16. In FIG. 16, network element 3110 includes a processor 3120 and a communications subsystem 3130, where the processor 3120 and communications subsystem 3130 cooperate to perform the methods or operations previously described.

Further, the various methods or operations described herein may be implemented by a communications device (e.g., network node 310, relay UE 320, remote UE 330, etc.). An example of a communications device is described below with regard to FIG. 17. The communications device 3200 may comprise a two-way wireless communication device having voice and data communication capabilities. In some embodiments, voice communication capabilities are optional. The communications device 3200 generally has the capability to communicate with other computer systems on the Internet. Depending on the exact functionality provided, the communications device 3200 may be referred to as a data messaging device, a two-way pager, a wireless e-mail device, a cellular telephone with data messaging capabilities, a wireless Internet appliance, a wireless device, a smart phone, a mobile device, or a data communication device, as examples.

Where the communications device 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. The particular design of the communication subsystem 3211 may be dependent upon the communication network 3219 in which the communications device 3200 is intended to operate.

Network access may also vary depending upon the type of communication network 3219. In some networks, network access is associated with a subscriber or user of the communications device 3200. The communications device 3200 may use a removable user identity module (RUIM) or a subscriber identity module (SIM) card in order to operate on a network. The SIM/RUIM interface 3244 is typically similar to a card slot into which a SIM/RUIM card may be inserted. The SIM/RUIM card may have memory and may hold many key configurations 3251 and other information 3253, such as identification and subscriber-related information.

When network registration or activation procedures have been completed, the communications device 3200 may send and receive communication signals over the communication network 3219. As illustrated, the communication network 3219 may comprise multiple base stations communicating with the communications device 3200.

Signals received by antenna 3216 through communication network 3219 are input to receiver 3212, which may perform such common receiver functions as signal amplification, frequency down conversion, filtering, channel selection, and the like. Analog to digital (A/D) conversion of a received signal allows more complex communication functions, such as demodulation and decoding to be performed in the DSP 3220. In a similar manner, signals to be transmitted are processed, including modulation and encoding for example, by DSP 3220 and are input to transmitter 3214 for digital to analog (D/A) conversion, frequency up conversion, filtering, amplification, and transmission over the communication network 3219 via antenna 3218. DSP 3220 not only processes communication signals but also provides for receiver and transmitter control. For example, the gains applied to communication signals in receiver 3212 and transmitter 3214 may be adaptively controlled through automatic gain control algorithms implemented in DSP 3220.

The communications device 3200 generally includes a processor 3238 which controls the overall operation of the device. Communication functions, including data and voice communications, are performed through communication subsystem 3211 in cooperation with the processor 3238. Processor 3238 also interacts with further device subsystems such as the display 3222, flash memory 3224, random access memory (RAM) 3226, auxiliary input/output (I/O) subsystems 3228, serial port 3230, one or more user interfaces such as keyboards or keypads 3232, speaker 3234, microphone 3236, other communications subsystem 3240 such as a short-range communications subsystem, and any other device subsystems generally designated as 3242. Serial port 3230 may include a USB port or other port currently known or developed in the future.

Some of the illustrated subsystems perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions, such as a calculator or task list.

Operating system software used by the processor 3238 may be stored in a persistent store such as flash memory 3224, which may instead be a read-only memory (ROM) or similar storage element (not shown). The operating system, specific device applications, or parts thereof, may be temporarily loaded into a volatile memory such as RAM 3226. Received communication signals may also be stored in RAM 3226.

As shown, flash memory 3224 may be constituted by different areas for both computer programs 3258 and program data storage 3250, 3252, 3254, and 3256. These different storage types indicate that each program may allocate a portion of flash memory 3224 for their own data storage use. Processor 3238, in addition to its operating system functions, may enable execution of software applications on the communications device 3200. A predetermined set of applications that control basic operations, including at least data and voice communication applications for example, may typically be installed on the communications device 3200 during manufacturing. Other applications may be installed subsequently or dynamically.

Applications and software may be stored on any computer-readable storage medium. The computer-readable storage medium may be tangible or in a transitory/non-transitory medium such as optical (e.g., CD, DVD, etc.), magnetic (e.g., tape), or other memory currently known or developed in the future.

One software application may be a personal information manager (PIM) application having the ability to organize and manage data items relating to the user of the communications device 3200 such as, but not limited to, e-mail, calendar events, voice mails, appointments, and task items. One or more memory stores may be available on the communications device 3200 to facilitate storage of PIM data items. Such a PIM application may have the ability to send and receive data items via the wireless network 3219. Further applications may also be loaded onto the communications device 3200 through the communication network 3219, an auxiliary I/O subsystem 3228, serial port 3230, short-range communications subsystem 3240, or any other suitable subsystem 3242, and installed by a user in the RAM 3226 or a non-volatile store (not shown) for execution by the processor 3238. Such flexibility in application installation may increase the functionality of the communications device 3200 and may provide enhanced on-device functions, communication-related functions, or both. For example, secure communication applications may enable electronic commerce functions and other such financial transactions to be performed using the communications device 3200.

In a data communication mode, a received signal such as a text message or web page download may be processed by the communication subsystem 3211 and input to the processor 3238, which may further process the received signal for output to the display 3222, or alternatively to an auxiliary I/O device 3228.

A user of the communications device 3200 may also compose data items, such as email messages for example, using the keyboard 3232, which may be a physical or on-screen/virtual complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of the communications device 3200 is similar, except that received signals may typically be output to a speaker 3234 and signals for transmission may be generated by a microphone 3236. Alternative voice or audio I/O subsystems 3228, such as a voice message recording subsystem, may also be implemented on the communications device 3200. Although voice or audio signal output may be accomplished primarily through the speaker 3234, display 3222 may also be used to provide an indication of the identity of a calling party, the duration of a voice call, or other voice call-related information, for example.

Serial port 3230 may be implemented in a personal digital assistant (PDA)-type device for which synchronization with a user's desktop computer (not shown) may be desirable, but such a port is an optional device component. Such a port 3230 may enable a user to set preferences through an external device or software application and may extend the capabilities of the communications device 3200 by providing for information or software downloads to the communications device 3200 other than through a wireless communication network. The alternate download path may, for example, be used to load an encryption key onto the communications device 3200 through a direct and thus reliable and trusted connection to thereby enable secure device communication. Serial port 3230 may further be used to connect the device to a computer to act as a modem.

Other communications subsystems 3240, such as a short-range communications subsystem, are further optional components which may provide for communication between the communications device 3200 and different systems or devices, which need not necessarily be similar devices. For example, the subsystems 3240 may include an infrared device and associated circuits and components or a Bluetooth™ communication module to provide for communication with similarly enabled systems and devices. Subsystems 3240 may further include non-cellular communications such as Wireless Local Area Networks (e.g., Wi-Fi®), WiMAX, near field communication (NFC), and/or radio frequency identification (RFID). The other communications subsystems 3240 may also include other suitable elements to be used to communicate with auxiliary devices such as tablet displays, keyboards or projectors.

Figure 18:
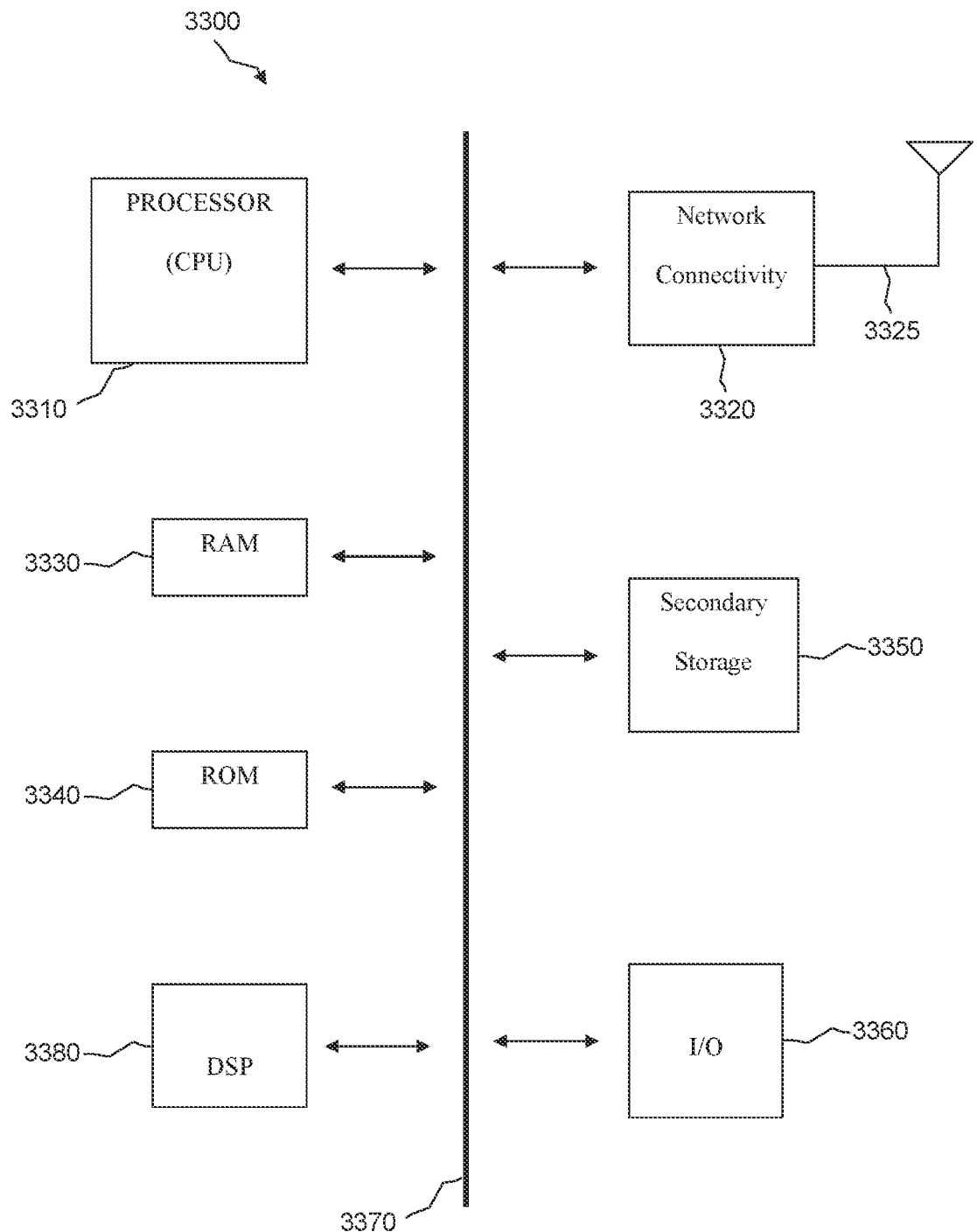
FIG. 18 illustrates an example of a processor and related components suitable for implementing the several embodiments of the present disclosure.

The communications device 3200 and other components described above might include a processing component that is capable of executing instructions related to the actions described above. FIG. 18 illustrates an example of a system 3300 that includes a processing component 3310 suitable for implementing one or more embodiments disclosed herein. In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, USB interface devices, serial interfaces, token ring devices, fiber distributed data interface (FDDI) devices, wireless local area network (WLAN) devices, radio transceiver devices such as code division multiple access (CDMA) devices, GSM radio transceiver devices, UMTS radio transceiver devices, LTE radio transceiver devices, new generation radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

The following are incorporated herein by reference for all purposes: 3GPP TS TS 23.285, 3GPP TS 23.303, 3GPP TS 23.041, 3GPP TS 36.321, 3GPP TS 36.331, 3GPP TS 22.268, ETSI EN 302 665, ETSI TS 102 894-2, ETSI EN 302 637-2, ETSI EN 302 637-3, ETSI TS 102 965, SP-160733, and 3GPP TS 22.969.

In an embodiment, a method for relaying Public Warning System (PWS) messages is provided. The method includes a communications device receiving a PWS message over a first communication technology. The method also includes the communications device relaying the PWS message (e.g., transmitting all or part of the PWS message that was received) over a second communication technology, wherein the second communication technology is different than the first communication technology.

In another embodiment, a communications device is provided. The communications device comprises a memory containing instructions and a processor coupled to the memory. The processor is configured to execute the instructions such that the communications device receives a PWS message over a first communication technology, and such that the communications device relays the PWS message (e.g., transmits all or part of the PWS message that was received) over a second communication technology, wherein the second communication technology is different than the first communication technology.

In yet another embodiment, a computer-readable medium is provided. The computer-readable medium contains instructions that, when executed by a processor cause a communications device to implement a method. The method includes the communications device receiving a PWS message over a first communication technology. The method also includes the communications device relaying the PWS message (e.g., transmitting all or part of the PWS message that was received) over a second communication technology, wherein the second communication technology is different than the first communication technology.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the scope disclosed herein.

What is claimed is:

1. A method for relaying Public Warning System (PWS) messages, the method comprising:
   receiving, at a relay user equipment (UE), a PWS message from a base station, wherein the relay UE receives the PWS message including a PWS message identifier having a first set of values from the base station over a first communication technology;
   generating, by the relay UE, a first output message comprising at least part of the PWS message, the first output message including at least a first parameter, a second parameter and an output message identifier, wherein the first parameter is used to indicate that the PWS message corresponds to a certain type of warning message, wherein the second parameter is used to distinguish between different PWS messages; and
   transmitting, by the relay UE, the first output message to a remote UE, wherein the relay UE transmits the first output message to the remote UE over a second communication technology, the second communication technology being different from the first communication technology,
   wherein the output message identifier includes a second set of values different than the first set of values based on either or both of the PWS message and a type of the first communication technology,
   wherein the output message identifier indicates a source of the PWS message,
   wherein the relay UE formats the first output message prior to transmitting the first output message to the remote UE, wherein the first output message is formatted based on the output message identifier within the first output message.

2. The method of claim 1, wherein the first communication technology comprises a radio access technology (RAT) and wherein the second communication technology comprises a short-range communication technology.

3. The method of claim 2, wherein the PWS message is received over the RAT in a telecommunications network, the telecommunications network comprising a Global System for Mobile communications (GSM)/Enhanced Data rates for GSM Evolution (EDGE) Radio Access Network (GERAN), a Universal Mobile Telecommunications System (UMTS), Universal Terrestrial Radio Access Network (UTRAN), an Evolved UTRAN (E-UTRAN), or a new generation Radio Access Network.

4. The method of claim 2, wherein the transmitting comprises the relay UE relaying all or part of the PWS message over the short-range communication technology to the remote UE via a Device to Device (D2D) interface.

5. The method of claim 4, further comprising:
   receiving, by the relay UE, a secondary PWS message related to the PWS message, wherein the relay UE receives the secondary PWS message from the base station over the RAT;
   generating, by the relay UE, a second output message containing all or part of the secondary PWS message related to the PWS message, wherein generating the second output message comprises the relay UE formatting the second output message to include at least one of a serial number, a message identifier, or a data coding scheme; and
   responsive to formatting the second output message, relaying, by the relay UE, the second output message to the remote UE over the short-range communication technology.

6. The method of claim 5, wherein the second output message is relayed over the short-range communication technology via the D2D interface, wherein the D2D interface comprises a PC5 interface.

7. The method of claim 2, wherein the relay UE relays, over the short-range communication technology, the PWS message as a Decentralized Environmental Notification Message (DENM) to the remote UE, wherein the remote UE is not configured to receive the PWS message from the base station over the first communication technology, wherein the relay UE provides an indication that the first output message contains a PWS message, and wherein the indication comprises a destination Layer-2 identifier.

8. A relay user equipment (UE) comprising:
   a memory containing instructions; and
   a processor coupled to the memory and configured upon execution of the instructions to:
   receive, at the relay UE, a Public Warning System (PWS) message from a base station, wherein the relay UE receives the PWS message including a PWS message identifier having a first set of values from the base station over a first communication technology;
   generate, by the relay UE, a first output message comprising at least part of the PWS message, the first output message including at least a first parameter, a second parameter and an output message identifier, wherein the first parameter is used to indicate that the PWS message corresponds to a certain type of warning message, wherein the second parameter is used to distinguish between different PWS messages; and
   transmit, by the relay UE, the first output message to a remote UE, wherein the relay UE transmits the first output message to the remote UE over a second communication technology, the second communication technology being different from the first communication technology,
   wherein the output message identifier includes a second set of values different than the first set of values based on either or both of the PWS message and a type of the first communication technology, wherein the output message identifier indicates a source of the PWS message, wherein the relay UE formats the first output message prior to transmitting the first output message to the remote UE, wherein the first output message is formatted based on the output message identifier within the first output message.

9. The relay UE of claim 8, wherein the first communication technology comprises a radio access technology (RAT) and wherein the second communication technology comprises a short-range communication technology.

10. The relay UE of claim 9, wherein the PWS message is received over the RAT in a telecommunications network, the telecommunications network comprising a Global System for Mobile communications (GSM)/Enhanced Data rates for GSM Evolution (EDGE) Radio Access Network (GERAN), a Universal Mobile Telecommunications System (UMTS), Universal Terrestrial Radio Access Network (UTRAN), an Evolved UTRAN (E-UTRAN), or a new generation Radio Access Network.

11. The relay UE of claim 9, wherein the transmitting comprises the relay UE relaying all or part of the PWS message over the short-range communication technology to the remote UE via a Device to Device (D2D) interface.

12. The relay UE of claim 11, wherein the processor is further configured upon execution of the instructions to:
receive, by the relay UE, a secondary PWS message related to the PWS message, wherein the relay UE receives the secondary PWS message from the base station over the RAT;
generate, by the relay UE, a second output message containing all or part of the secondary PWS message related to the PWS message, wherein generating the second output message comprises the relay UE formatting the second output message to include at least one of a serial number, a message identifier, or a data coding scheme; and
responsive to formatting the second output message, relay, by the relay UE, the second output message to the remote UE over the short-range communication technology.

13. The relay UE of claim 12, wherein the second output message is relayed over the short-range communication technology via the D2D interface, wherein the D2D interface comprises a PC5 interface.

14. The relay UE of claim 9, wherein the relay UE relays, over the short-range communication technology, the PWS message as a Decentralized Environmental Notification Message (DENM) to the remote UE, wherein the remote UE is not configured to receive the PWS message from the base station over the first communication technology, wherein the relay UE provides an indication that the first output message contains a PWS message, and wherein the indication comprises a destination Layer-2 identifier.

15. A non-transitory computer readable medium containing instructions executable by a processor of a relay user equipment (UE) such that when executed cause the processor to:
receive, at the relay UE, a Public Warning System (PWS) message from a base station, wherein the relay UE receives the PWS message including a PWS message identifier having a first set of values from the base station over a first communication technology;
generate, by the relay UE, a first output message comprising at least part of the PWS message, the first output message including at least a first parameter, a second parameter and an output message identifier, wherein the first parameter is used to indicate that the PWS message corresponds to a certain type of warning message, wherein the second parameter is used to distinguish between different PWS messages; and
transmit, by the relay UE, the first output message to a remote UE, wherein the relay UE transmits the first output message to the remote UE over a second communication technology, the second communication technology being different from the first communication technology, wherein the output message identifier includes a second set of values different than the first set of values based on either or both of the PWS message and a type of the first communication technology, wherein the output message identifier indicates a source of the PWS message, wherein the relay UE formats the first output message prior to transmitting the first output message to the remote UE, wherein the first output message is formatted based on the output message identifier within the first output message.

16. The non-transitory computer readable medium of claim 15, wherein the first communication technology comprises a radio access technology (RAT) and wherein the second communication technology comprises a short-range communication technology.

17. The non-transitory computer readable medium of claim 16, wherein the PWS message is received over the RAT in a telecommunications network, the telecommunications network comprising a Global System for Mobile communications (GSM)/Enhanced Data rates for GSM Evolution (EDGE) Radio Access Network (GERAN), a Universal Mobile Telecommunications System (UMTS), Universal Terrestrial Radio Access Network (UTRAN), an Evolved UTRAN (E-UTRAN), or a new generation Radio Access Network.

18. The non-transitory computer readable medium of claim 16, wherein the transmitting comprises the relay UE relaying all or part of the PWS message over the short-range communication technology to the remote UE via a Device to Device (D2D) interface.

19. The non-transitory computer readable medium of claim 18, wherein the processor is further configured upon execution of the instructions to:
receive, by the relay UE, a secondary PWS message related to the PWS message, wherein the relay UE receives the secondary PWS message from the base station over the RAT;
generate, by the relay UE, a second output message containing all or part of the secondary PWS message related to the PWS message, wherein generating the second output message comprises the relay UE formatting the second output message to include at least one of a serial number, a message identifier, or a data coding scheme; and
responsive to formatting the second output message, relay, by the relay UE, the second output message to the remote UE over the short-range communication technology.

20. The non-transitory computer readable medium of claim 19, wherein the second output message is relayed over the short-range communication technology via the D2D interface, wherein the D2D interface comprises a PC5 interface.

21. The non-transitory computer readable medium of claim 16, wherein the relay UE relays, over the short-range communication technology, the PWS message as a Decentralized Environmental Notification Message (DENM) to the remote UE, wherein the remote UE is not configured to receive the PWS message from the base station over the first communication technology, wherein the relay UE provides an indication that the first output message contains a PWS message, and wherein the indication comprises a destination Layer-2 identifier.

* * * * *